(12) United States Patent
Echigo et al.

(10) Patent No.: US 10,020,527 B2
(45) Date of Patent: Jul. 10, 2018

(54) ELECTROCHEMICAL ELEMENT, SOLID OXIDE FUEL CELL, AND METHODS FOR PRODUCING THE SAME

(71) Applicant: Osaka Gas Co., Ltd., Osaka-shi (JP)

(72) Inventors: Mitsuaki Echigo, Osaka (JP); Hisao Ohnishi, Osaka (JP); Kyohei Manabe, Osaka (JP); Osamu Yamazaki, Osaka (JP); Kazuyuki Minami, Osaka (JP); Yuji Tsuda, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 15/511,805

(22) PCT Filed: Sep. 18, 2015

(86) PCT No.: PCT/JP2015/076790
§ 371 (c)(1),
(2) Date: Mar. 16, 2017

(87) PCT Pub. No.: WO2016/043328
PCT Pub. Date: Mar. 24, 2016

(65) Prior Publication Data
US 2017/0309941 A1    Oct. 26, 2017

(30) Foreign Application Priority Data
Sep. 19, 2014  (JP) .................. 2014-192029

(51) Int. Cl.
*H01M 8/1226* (2016.01)
*H01M 8/1253* (2016.01)
(Continued)

(52) U.S. Cl.
CPC ....... *H01M 8/1226* (2013.01); *H01M 4/8807* (2013.01); *H01M 4/8828* (2013.01);
(Continued)

(58) Field of Classification Search
CPC .......................... H01M 8/1226; H01M 4/8807
See application file for complete search history.

(56) References Cited

U.S. PATENT DOCUMENTS

2002/0048699 A1    4/2002  Steele et al.
2003/0207166 A1   11/2003  Hara et al.
(Continued)

FOREIGN PATENT DOCUMENTS

JP    2003323901 A    11/2003
JP    2004512651 A     4/2004
(Continued)

*Primary Examiner* — Olatunji Godo
(74) *Attorney, Agent, or Firm* — The Webb Law Firm

(57) ABSTRACT

Realized are an electrochemical element and a solid oxide fuel cell that have a dense electrolyte layer and that have excellent durability and robustness, and methods for producing the same. An electrochemical element includes: a metal substrate 2 having a plurality of through holes 21; an electrode layer 3 provided over a front face of the metal substrate 2; and an electrolyte layer 4 provided over the electrode layer 3, wherein the through holes 21 are provided passing through the front face and a back face of the metal substrate 2, the electrode layer 3 is provided in a region larger than a region, of the metal substrate 2, in which the through holes 21 are provided, and the electrolyte layer 4 has a first portion 41 coating the electrode layer 3, and a second portion 42 that is in contact with the front face of the metal substrate 2.

14 Claims, 6 Drawing Sheets

(51) Int. Cl.
*H01M 4/90* (2006.01)
*H01M 4/88* (2006.01)
*H01M 8/124* (2016.01)

(52) U.S. Cl.
CPC ....... *H01M 4/9066* (2013.01); *H01M 8/1253* (2013.01); *H01M 2008/1293* (2013.01)

(56) References Cited

U.S. PATENT DOCUMENTS

| | | |
|---|---|---|
| 2005/0221153 A1 | 10/2005 | Sugimoto et al. |
| 2007/0072070 A1 | 3/2007 | Quek et al. |
| 2008/0096080 A1 | 4/2008 | Batawi et al. |
| 2008/0160352 A1 | 7/2008 | Brandner et al. |
| 2008/0193816 A1 | 8/2008 | Schaevitz et al. |
| 2010/0062317 A1 | 3/2010 | Selcuk |
| 2013/0108943 A1 | 5/2013 | Yamanis et al. |

FOREIGN PATENT DOCUMENTS

| | | |
|---|---|---|
| JP | 2004220954 A | 8/2004 |
| JP | 2004355814 A | 12/2004 |
| JP | 2007323957 A | 12/2007 |
| JP | 200823497 A | 2/2008 |

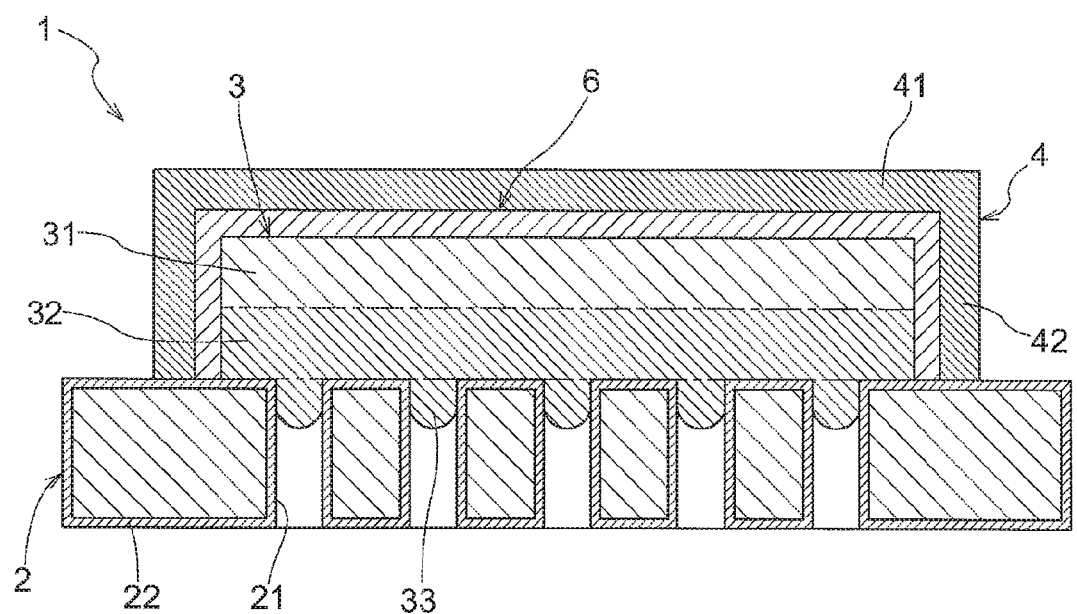
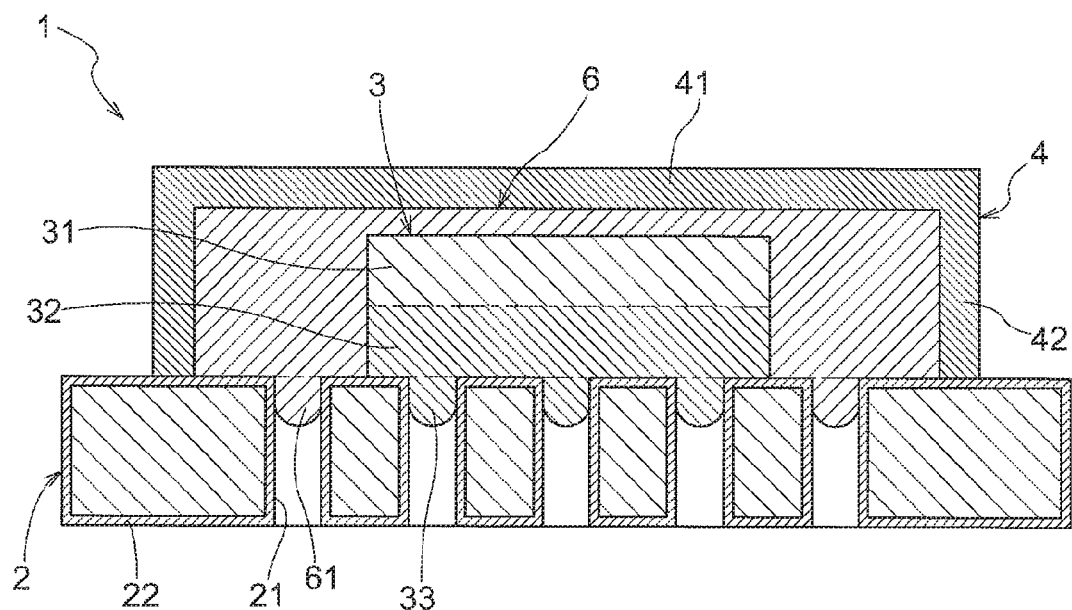

ELECTROCHEMICAL ELEMENT, SOLID OXIDE FUEL CELL, AND METHODS FOR PRODUCING THE SAME

CROSS-REFERENCE TO RELATED APPLICATIONS

This application is the United States national phase of International Application No. PCT/JP2015/076790 filed Sep. 18, 2015, and claims priority to Japanese Patent Application No. 2014-192029 filed Sep. 19, 2014, the disclosures of which are hereby incorporated in their entirety by reference.

TECHNICAL FIELD

The present invention relates to an electrochemical element having a metal substrate, an electrode layer, and an electrolyte layer, a solid oxide fuel cell, and methods for producing the same.

BACKGROUND ART

In conventional electrolyte-supported solid oxide fuel cell stacks (hereinafter, referred to as "SOFCs") and electrode-supported SOFCs, sintering at a high temperature (e.g., 1400° C.) is performed in order to obtain a dense and highly-gastight electrolyte layer. In recent years, metal-supported SOFCs in which a fuel electrode, an air electrode, and an electrolyte layer are supported over a metal plate have been developed in order to reduce the thickness and to improve the robustness.

Patent Document 1 discloses a metal-supported SOFC in which a fuel electrode, an electrolyte layer, and an air electrode in the shape of thin films are layered in this order on a porous metal substrate. In the production process of this SOFC, after an electrolyte material is applied to and dried on a fuel electrode, pressing treatment is performed. Subsequently, sintering is performed to form a dense electrolyte layer.

PRIOR ART DOCUMENTS

Patent Documents

Patent Document 1: JP 2008-234927A

DISCLOSURE OF THE INVENTION

Problem to be Solved by the Invention

If heat treatment is performed at a high temperature during production of a metal-supported SOFC, a metal substrate that functions as a support may deteriorate, and diffusion of elements such as Cr from the metal substrate may adversely affect constituent elements (an electrode layer and an electrolyte layer) of the SOFC, and thus the durability of the SOFC may decrease. Accordingly, heat treatment at a low temperature is desirable. On the other hand, if the heat treatment temperature during production is lowered, it becomes difficult to obtain a good electrode layer and electrolyte layer. For example, if the heat treatment temperature during production is lowered, generally, it is difficult to form a dense electrolyte layer on an electrode layer under conditions in which the treatment temperature is suppressed to a low temperature, and thus a good electrochemical element cannot be obtained. Furthermore, the joint strength between the electrolyte layer and the electrode layer decreases, and thus the robustness of the SOFC may deteriorate.

Note that the above-described SOFCs, solid oxide electrolysis cells (hereinafter, referred to as "SOECs") in which hydrogen is produced from water through electrolysis, and oxygen sensors that use solid oxides have the same basic structure. That is to say, an electrochemical element having a metal substrate, an electrode layer, and an electrolyte layer is used in SOFCs, SOECs, and oxygen sensors. The above-described problems are common to these electrochemical elements, SOFCs, SOECs, and oxygen sensors.

The present invention was arrived at in view of the above-described problems, and it is an object thereof to realize an electrochemical element and a solid oxide fuel cell that have excellent robustness, including a good electrode layer over which a dense electrolyte layer can be arranged while the treatment temperature during formation of the electrolyte layer is suppressed to a low temperature, and methods for producing the same.

Means for Solving Problem

In order to achieve the above-described object, the present invention is directed to an electrochemical element including: a metal substrate having a plurality of through holes; an electrode layer provided over a front face of the metal substrate; and an electrolyte layer provided over the electrode layer, wherein the through holes are provided passing through the front face and a back face of the metal substrate, the electrode layer is provided in a region larger than a region, of the metal substrate, in which the through holes are provided, and the electrolyte layer has a first portion coating the electrode layer, and a second portion that is in contact with the front face of the metal substrate.

With this characteristic configuration, the electrolyte layer has a first portion coating the electrode layer, and a second portion that is in contact with the front face of the metal substrate. Accordingly, the electrolyte layer can be configured so as to enclose the electrode layer, and thus a configuration that can suppress detachment of the electrolyte layer can be provided. Furthermore, the electrolyte layer can be joined to the metal substrate by the second portion, and the electrochemical element as a whole can be made to be excellent in terms of robustness. Furthermore, the second portion can suppress the leakage of gas from the electrode layer. This aspect will be described below. While the electrochemical element is in operation, gas is supplied from the back side of the metal substrate via the through holes to the electrode layer. If the end portion of the electrode layer is exposed at a part thereof where the second portion is not provided, leakage of gas may occur therefrom. If the end portion of the electrode layer is reliably covered by the second portion, it is possible to suppress the leakage of gas without providing another member such as a gasket.

In another characteristic configuration of the electrochemical element according to the present invention, the electrode layer has insertion portions that are inserted into the through holes and block the through holes.

With this characteristic configuration, the electrode layer has insertion portions that are inserted into the through holes and block the through holes. Accordingly, the binding strength between the electrode layer and the metal substrate can be increased. That is to say, an electrochemical element that has superior robustness can be realized.

In another characteristic configuration of the electrochemical element according to the present invention, an upper part, of the electrode layer, that is adjacent to the electrolyte layer has a strength higher than that of a lower part thereof adjacent to the metal substrate.

With this characteristic configuration, the upper part adjacent to the electrolyte layer has high strength. Accordingly, the joint strength between the electrode layer and the electrolyte layer can be increased. Furthermore, methods that may have an impact on the electrode layer functioning as a base layer, such as a flame gunning method (a thermal spraying method) or an aerosol deposition method, can be applied in the formation of the electrolyte layer. In this case, a dense electrolyte layer can be formed through treatment at a low temperature, and the durability of the electrochemical element is expected to improve because treatment at a high temperature is not performed.

In another characteristic configuration of the electrochemical element according to the present invention, an upper part, of the electrode layer, that is adjacent to the electrolyte layer has a density higher than that of a lower part thereof adjacent to the metal substrate.

With this characteristic configuration, the upper part adjacent to the electrolyte layer has a high density. Accordingly, the joint strength between the electrode layer and the electrolyte layer can be increased. Furthermore, since the electrolyte layer is formed over the dense surface, the density of the electrolyte layer can be improved as well. Meanwhile, although gas permeability is required for an electrode layer of an electrochemical element, the gas permeability decreases in accordance with an increase in density. Thus, according to the above-described characteristic configuration, while the lower part is configured to have a density lower than that of the upper part so as to ensure gas permeability, the upper part is configured to have a density higher than that of the lower part so that the joint strength between the electrode layer and the electrolyte layer and the density of the electrolyte layer that is formed over the electrode layer can be improved.

In another characteristic configuration of the electrochemical element according to the present invention, the electrode layer is made of cermet, and an upper part, of the electrode layer, that is adjacent to the electrolyte layer has a content ratio of cermet aggregate higher than that of a lower part thereof adjacent to the metal substrate.

With this characteristic configuration, the upper part adjacent to the electrolyte layer has a higher content ratio of cermet aggregate. Accordingly, it is possible to increase the strength and the density of the upper part, and to improve the joint strength between the electrode layer and the electrolyte layer, form the electrolyte layer at a lower temperature, and ensure the gas permeability of the electrode layer. Accordingly, the robustness and the durability of the electrochemical element can be increased.

In another characteristic configuration of the electrochemical element according to the present invention, the metal substrate is made of a ferrite-based stainless steel.

With this characteristic configuration, the metal substrate is made of a ferrite-based stainless steel. Accordingly, the metal substrate can be made to be excellent in terms of thermal resistance and corrosion resistance, and the durability and the reliability of the electrochemical element can be increased. Furthermore, the metal substrate has a coefficient of thermal expansion close to those of materials, for example, such as YSZ (yttrium-stabilized zirconia) or GDC (gadolinium-doped ceria) for forming the electrode layer or the electrolyte layer. Accordingly, even when temperature cycles between a low temperature and a high temperature are repeated, damage is not likely to occur. Thus, it is possible to produce an electrochemical element that has excellent long-term durability.

In another characteristic configuration of the electrochemical element according to the present invention, the electrolyte layer contains a zirconia-based ceramic.

With this characteristic configuration, the electrolyte layer contains a zirconia-based ceramic. Accordingly, for example, it is possible to realize a high-performance electrochemical element that can be used in a high-temperature range at about 650° C. or higher.

In order to achieve the above-described object, the present invention is directed to an electrochemical element including: a metal substrate having a plurality of through holes; an electrode layer provided over a front face of the metal substrate; and an electrolyte layer provided over the electrode layer, wherein the through holes are provided passing through the front face and a back face of the metal substrate, the through holes are formed inside a region in which the electrolyte layer is formed, and the electrolyte layer has a first portion coating the electrode layer, and a second portion that is in contact with the front face of the metal.

With this characteristic configuration, the electrolyte layer has a first portion coating the electrode layer, and a second portion that is in contact with the front face of the metal substrate. Accordingly, the electrolyte layer can be configured so as to enclose the electrode layer, and thus a configuration that can suppress detachment of the electrolyte layer can be provided. Furthermore, the electrolyte layer can be joined to the metal substrate by the second portion, and the electrochemical element as a whole can be made to be excellent in terms of robustness. Furthermore, the second portion can suppress the leakage of gas from the electrode layer. This aspect will be described below. While the electrochemical element is in operation, gas is supplied from the back side of the metal substrate via the through holes to the electrode layer. If the end portion of the electrode layer is exposed at a part thereof where the second portion is not provided, leakage of gas may occur therefrom. If the end portion of the electrode layer is reliably covered by the second portion, it is possible to suppress the leakage of gas without providing another member such as a gasket. Moreover, since the region in which the through holes are formed is covered by the electrolyte layer having high gastightness and gas barrier properties, additional structures for preventing leakage of gas to the outside, such as gaskets or sealants, are not necessary. Thus, an increase in the production cost of the elements can be suppressed.

In order to achieve the above-described object, the present invention is directed to a solid oxide fuel cell in which an electrode layer functioning as a counter electrode of the electrode layer is provided over the electrolyte layer of the above-described electrochemical element.

With this characteristic configuration, a solid oxide fuel cell (SOFC) has a configuration in which an electrode layer functioning as a counter electrode of the electrode layer is provided over the electrolyte layer of the electrochemical element. Accordingly, it is possible to realize a solid oxide fuel cell that has a dense electrolyte layer and that has excellent durability and robustness.

In order to achieve the above-described object, the present invention is directed to a method for producing an electrochemical element having a metal substrate, an electrode layer, and an electrolyte layer, in which the metal substrate has a plurality of through holes that are provided passing through a front face and a back face thereof, the method including: an electrode layer forming step of forming an electrode layer in a region larger than a region, of the front face of the metal substrate, in which the through holes are provided; and an electrolyte layer forming step of, after the electrode layer forming step, forming an electrolyte layer having a first portion coating the electrode layer, and a second portion that is in contact with the front face of the metal substrate, by affixing an electrolyte material, which is a material for forming the electrolyte layer, to an area extending over the electrode layer and the front face of the metal substrate.

With this characteristic configuration, the method includes an electrolyte layer forming step of forming an electrolyte layer having a first portion coating the electrode layer, and a second portion that is in contact with the front face of the metal substrate, by affixing an electrolyte material, which is a material for forming the electrolyte layer, to an area extending over the electrode layer and the front face of the metal substrate. Accordingly, the electrolyte layer can be configured so as to enclose the electrode layer, and thus a configuration that can suppress detachment of the electrolyte layer can be provided. Furthermore, the electrolyte layer can be joined to the metal substrate by the second portion, and the electrochemical element as a whole can be made to be excellent in terms of robustness. Furthermore, it is possible to produce an electrochemical element in which the second portion suppresses the leakage of gas from the electrode layer. This aspect will be described below. While the electrochemical element is in operation, gas is supplied from the back side of the metal substrate via the through holes to the electrode layer. If the end portion of the electrode layer is exposed at a part thereof where the second portion is not provided, leakage of gas may occur therefrom. If the end portion of the electrode layer is reliably covered by the second portion, it is possible to suppress the leakage of gas without providing another member such as a gasket.

In another characteristic configuration of the method for producing an electrochemical element according to the present invention, the electrode layer forming step has: a preliminary applying step of applying electrode layer material paste containing an electrode layer material to the front face of the metal substrate; a pushing and wiping step of, after the preliminary applying step, pushing the electrode layer material paste into the through holes and wiping away the electrode material paste remaining on the front face of the metal substrate; and a main applying step of, after the pushing step, applying the electrode layer material paste to the front face of the metal substrate.

If the electrode material paste is applied to the metal substrate having the through holes, part of the paste enters into the through holes, and a recess is formed on the surface of the applied paste. If the electrolyte layer is formed on that recess, the recess has an adverse effect, and thus a dense electrolyte layer cannot be formed. Thus, a pushing and wiping step of pushing the electrode layer material paste into the through holes and wiping away the electrode material paste remaining on the front face of the metal substrate is performed, so that the through holes are filled (blocked) by the paste, and the surface of the metal substrate becomes smooth. If the electrode layer material paste is applied to the front face of the metal substrate after this step, an electrode layer having a smooth surface can be obtained.

That is to say, with this characteristic configuration, the electrode layer forming step includes the preliminary applying step, the pushing and wiping step that is performed after the preliminary applying step, and the main applying step that is performed after the pushing step, and thus it is possible to form an electrode layer that has a smooth upper face while forming the insertion portions that are inserted into the through holes of the metal substrate and block the through holes. Thus, a dense electrolyte layer having a smooth surface can be formed over a smooth electrode layer, and an electrochemical element that has superior robustness can be produced. Furthermore, an electrolyte layer can be formed over the obtained smooth electrode layer using a low-temperature process such as a low-temperature sintering method, an aerosol deposition method, a flame gunning method (a thermal spraying method), or the like, and thus an electrochemical element that has excellent durability can be produced because heat treatment at a high temperature is not performed.

In another characteristic configuration of the method for producing an electrochemical element according to the present invention, the electrode layer material paste is diluted with a solvent, and a solvent dilution ratio of the electrode layer material paste used in the preliminary applying step is higher than a solvent dilution ratio of the electrode layer material paste used in the main applying step.

That is to say, with this characteristic configuration, in the preliminary applying step, electrode layer material paste having a high solvent dilution ratio is applied to the surface of the metal substrate, and thus the material for forming the electrode layer is likely to enter into the through holes of the metal substrate. Accordingly, the through holes can be more reliably filled (blocked) with the electrode layer material, and an electrode layer having a smoother surface can be obtained. That is to say, a denser electrolyte layer can be formed over an electrode layer, and an electrochemical element that has superior robustness can be produced. Furthermore, an electrolyte layer can be formed over the obtained smooth electrode layer using a low-temperature process such as a low-temperature sintering method, an aerosol deposition method, a flame gunning method (a thermal spraying method), or the like, and thus an electrochemical element that has excellent durability can be produced because heat treatment at a high temperature is not performed.

In another characteristic configuration of the method for producing an electrochemical element according to the present invention, the electrode layer is made of cermet, and the electrode layer forming step has two steps performed with different proportions of aggregate mixed into an electrode layer material, which is a material for forming the electrode layer, consisting of: a first forming step of forming an electrode layer using the electrode layer material in which the aggregate mixed proportion is a first proportion; and a second forming step of, after the first forming step, forming an electrode layer using the electrode layer material in which the aggregate mixed proportion is a second proportion, which is higher than the first proportion.

That is to say, with this characteristic configuration, after the first forming step, a second forming step of forming an electrode layer using an electrode layer material in which the aggregate mixed proportion is a second proportion, which is higher than a first proportion, is performed, and thus the aggregate mixed proportion can be made to be higher in the upper portion in the electrode layer than in the lower portion. Accordingly, it is possible to increase the strength and the density of the upper portion of the electrode layer, and to improve the joint strength between the electrode layer and the electrolyte layer, form the electrolyte layer at a low temperature, and ensure the gas permeability of the electrode layer. Accordingly, an electrochemical element whose robustness and durability are increased can be produced.

In order to achieve the above-described object, the present invention is directed to a method for producing a solid oxide fuel cell, including a counter electrode layer forming step of, after the above-described method for producing an electrochemical element is performed, forming an electrode layer functioning as a counter electrode of the electrode layer, over the electrolyte layer.

With this characteristic configuration, a solid oxide fuel cell (SOFC) is produced in which an electrode layer functioning as a counter electrode of the electrode layer is provided over the electrolyte layer of the electrochemical element. Accordingly, it is possible to produce a solid oxide fuel cell that has a dense electrolyte layer and that has excellent durability and robustness.

BRIEF DESCRIPTION OF THE DRAWINGS

FIG. 3 is a cross-sectional view showing the configuration of an electrochemical element.
FIG. 4 is a cross-sectional view showing the configuration of an electrochemical element.

BEST MODE FOR CARRYING OUT THE INVENTION

First Embodiment

Figure 1:
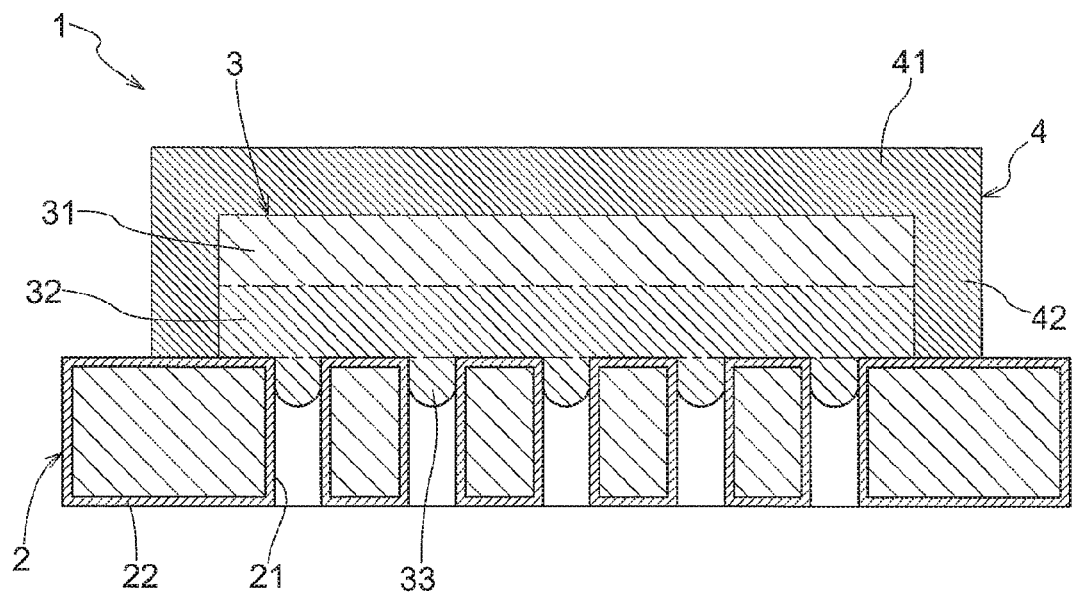
FIG. 1 is a cross-sectional view showing the configuration of an electrochemical element.

Hereinafter, an electrochemical element 1, a solid oxide fuel cell stack (SOFC) cell 100, a method for producing the electrochemical element, and a method for producing the SOFC will be described with reference to FIGS. 1 and 2. In the description of positional relationships between layers and the like, for example, an electrolyte layer 4 side as seen from an electrode layer is referred to as "upper" or "upper side", and a metal substrate 2 side as seen from the electrode layer is referred to as "lower" or "lower side".
Electrochemical Element 1

The electrochemical element 1 includes a metal substrate 2 having a plurality of through holes 21, an electrode layer 3 provided on a front face of the metal substrate 2, and an electrolyte layer 4 provided over the electrode layer 3. The electrode layer 3 is configured so as to be electron-conductive and gas-permeable. The electrolyte layer 4 is configured so as to be oxygen ion-conductive.
Metal Substrate 2

The metal substrate 2 has a function of maintaining the strength of the electrochemical element 1 by supporting the electrode layer 3 and the electrolyte layer 4. As a material for forming the metal substrate 2, a material that has excellent electron conductivity, thermal resistance, oxidation resistance, and corrosion resistance is used. For example, a ferrite-based stainless steel, an austenite-based stainless steel, a nickel-based alloy, or the like are used. In particular, an alloy containing chromium is preferably used.

The metal substrate 2 has the plurality of through holes 21 provided passing through the front face and the back face of the metal substrate 2. For example, the through holes 21 can be provided passing through the metal substrate 2 by performing laser processing or the like. The through holes 21 have a function of allowing gas to pass therethrough from the back face to the front face of the metal substrate 2. In order to make the metal substrate 2 gas-permeable, porous metals can also be used.

The through holes 21 are preferably provided in a region smaller than the region, of the metal substrate 2, in which the electrode layer 3 is provided.

The surface of the metal substrate 2 is provided with a thin metal oxide film 22. The metal oxide film 22 is provided not only on faces of the metal substrate 2 exposed to the outside, but also on faces (interfaces) thereof in contact with the electrode layer 3 and faces inside the through holes 21. The metal oxide film 22 can suppress the mutual diffusion of elements between the metal substrate 2 and the electrode layer 3. For example, if a ferrite-based stainless steel is used as the metal substrate 2, the metal oxide film 22 is mainly made of a chromium oxide. In this case, the diffusion of chromium atoms and the like of the metal substrate 2 to the electrode layer 3 or the electrolyte layer 4 is suppressed by the metal oxide film 22 mainly made of a chromium oxide. The thickness of this metal oxide film is preferably of the submicron order. For example, the average thickness is preferably approximately 0.3 µm or more and 0.7 µm or less. The minimum film thickness is preferably about 0.1 µm or more. The maximum film thickness is preferably about 1.1 µm or less.

If the metal substrate 2 is made of a ferrite-based stainless steel, it has a coefficient of thermal expansion close to those of materials such as YSZ (yttria-stabilized zirconia) or GDC (gadolinium-doped ceria, also referred to as CGO) for forming the electrode layer 3 or the electrolyte layer 4. Accordingly, even when temperature cycles between a low temperature and a high temperature are repeated, the electrochemical element 1 is not likely to be damaged. Thus, this configuration is preferable because it is possible to realize an electrochemical element 1 that has excellent long-term durability.
Electrode Layer 3

As shown in FIG. 1, the electrode layer 3 is provided in a state of being a thin film in a region larger than the region, of the front face of the metal substrate 2, in which the through holes 21 are provided. As a material for forming the electrode layer 3, for example, cermet materials such as NiO-CGO (gadolinium-doped ceria), Ni-CGO, NiO—YSZ, Ni—YSZ, CuO—CeO$_2$, or Cu—CeO$_2$ can be used. In these examples, CGO, YSZ, and CeO$_2$ can be referred to as cermet aggregate. The electrode layer 3 is preferably formed using a low-temperature sintering method (e.g., wet method using sintering in a low-temperature range without performing sintering in a high-temperature range at 1400° C., etc.), an aerosol deposition method, a flame gunning method (thermal spraying method), or the like. With these processes that can be used in a low-temperature range, for example, it is possible to obtain a good electrode layer 3 without performing sintering in a high-temperature range at 1400° C., etc. Thus, this configuration is preferable because it is possible to realize an electrochemical element that has excellent durability, in which the metal substrate 2 is not damaged, and mutual diffusion of elements between the metal substrate 2 and the electrode layer 3 can be suppressed. Furthermore, the low-temperature sintering method is more preferably used because it is easy to handle the raw materials.

The electrode layer 3 may include insertion portions 33 that are inserted into the through holes 21 of the metal substrate 2 and block the through holes 21. If necessary, the electrode layer 3 may have a multi-layer structure consisting of, for example, a first layer 32 (lower part) that is adjacent to the front face of the metal substrate, and a second layer 31 (upper part) that is provided on the first layer 32 and is adjacent to the electrolyte layer 4.

In order to make the electrode layer 3 gas-permeable, its interior and surface have a plurality of pores 34. The pores 34 may have a size selected as appropriate so as to allow reactions to progress smoothly in electrochemical reaction. For example, the pores 34 may include pores whose openings 35 each have a diameter of 0.1 μm or more and 5 μm or less. The pores more preferably include pores whose openings each have a diameter of 0.1 μm or more and 3 μm or less, and even more preferably include pores whose openings each have a diameter of 0.1 μm or more and 1 μm or less.

The insertion portions 33, the first layer 32, and the second layer 31 are preferably made of the same material, but may be made of respectively different materials. For example, they may be made of materials containing different elements, or materials having different element ratios. Furthermore, the insertion portions 33, the first layer 32, and the second layer 31 may have different content ratios of cermet aggregate, density, and strength. The number of layers in the electrode layer 3 may be three or more, or may be one.

Furthermore, the electrode layer 3 may be configured such that the content ratio of cermet aggregate, the density, and the strength successively increase from bottom to top of the electrode layer 3. In this case, the electrode layer 3 may not have regions clearly identified as layers. However, also in this case, in the electrode layer 3, a part (upper part) adjacent to the electrolyte layer 4 may have a content ratio of cermet aggregate, a density, strength, and the like higher than those of a part (lower part) adjacent to the metal substrate 2.

For example, a configuration is possible in which the second layer 31 (upper part) adjacent to the electrolyte layer 4 has a strength higher than that of the first layer 32 (lower part) adjacent to the front face of the metal substrate. Accordingly, it is conceivable that methods that may have an impact on the electrode layer 3 functioning as a base layer, such as an aerosol deposition method and a thermal spraying method, can be easily applied in the formation of the electrolyte layer 4. With this method for forming the electrolyte layer 4, a dense electrolyte layer can be formed through treatment at a low temperature, and the durability of the electrochemical element 1 is expected to improve because treatment at a high temperature is not performed.

Furthermore, a configuration in which the second layer 31 (upper part) has a strength higher than that of the first layer 32 (lower part) can be realized by, for example, methods for making the types of cermet material, the particle sizes of a material powder that is used, or production conditions different therebetween. Furthermore, as described later, the configuration in which the second layer 31 (upper part) has a strength higher than that of the first layer 32 (lower part) can be realized also by making the content ratios of cermet aggregate different therebetween.

Furthermore, the electrode layer 3 may be configured such that the second layer 31 (upper part) adjacent to the electrolyte layer 4 has a density higher than that of the first layer 32 (lower part) adjacent to the front face of the metal substrate. Accordingly, since the electrolyte layer 4 is formed over the dense surface, the density of the electrolyte layer 4 can be improved as well. Meanwhile, although gas permeability is required for an electrode layer of an electrochemical element, the gas permeability decreases in accordance with an increase in density. Thus, while the lower part is configured to have a density lower than that of the upper part so as to ensure gas permeability, the upper part is configured to have a density higher than that of the lower part so that the binding strength between the electrode layer 3 and the electrolyte layer 4 and the density of the electrolyte layer 4 can be improved.

Furthermore, a configuration in which the second layer 31 (upper part) has a density higher than that of the first layer 32 (lower part) can be realized by, for example, methods for making the types of cermet material, the particle sizes of a material powder that is used, or production conditions different therebetween. Furthermore, as described later, the configuration in which the second layer 31 (upper part) has a density higher than that of the first layer 32 (lower part) can be realized also by making the content ratios of cermet aggregate different therebetween.

Note that density is the proportion by which the material forming the electrode layer 3 occupies in a space. That is to say, if the second layer 31 (upper part) has a density higher than that of the first layer 32 (lower part), the first layer 32 has a proportion of voids or pores present in the surface or interior thereof, higher than that of the second layer 31.

For example, a configuration is possible in which the second layer 31 (upper part) adjacent to the electrolyte layer 4 has a content ratio of cermet aggregate higher than that of the first layer 32 (lower part) adjacent to the front face of the metal substrate. Accordingly, since the strength and the density of the upper part can be increased, it is conceivable that methods that may have an impact on the electrode layer 3 functioning as a base layer, such as an aerosol deposition method and a flame gunning method (thermal spraying method), can be easily applied in the formation of the electrolyte layer 4. With this method for forming the electrolyte layer 4, a dense electrolyte layer can be formed through treatment at a low temperature, and the durability of the electrochemical element 1 is expected to improve because treatment at a high temperature is not performed.

Note that the state in which the content ratio of cermet aggregate is high refers to a state in which the content ratio of metal or metal oxide (e.g., NiO-CGO) mixed in the cermet material is low.

As shown in FIG. 1, the insertion portions 33 are provided in a state of being inserted into the through holes 21 and blocking the through holes 21. For example, the insertion portions can be provided in a state of being inserted into the through holes 21 to a depth of approximately several micrometers. Furthermore, they can be inserted to a depth of approximately several micrometers or more. If the electrode layer 3 has the insertion portions 33, defects in the electrode layer 3 can be suppressed, as a result of which it is possible to form a good electrolyte layer 4, and to realize a superior electrochemical element 1.

Electrolyte Layer 4

The electrolyte layer 4 is formed over the upper side of the electrode layer 3. The electrolyte layer 4 may have a structure including a first portion 41 coating the electrode layer 3 and a second portion 42 that is in contact with the front face of the metal substrate 2. In this case, as shown in FIG. 1, the electrolyte layer 4 is provided on an area extending over (across) the electrode layer 3 and the front face of the metal substrate 2 in a horizontal cross-sectional view. Accordingly, the electrolyte layer 4 can be joined to the metal substrate 2 by the second portion 42, and the electrochemical element as a whole can be made to be excellent in terms of robustness.

Furthermore, the second portion 42 can suppress the leakage of gas from the electrode layer 3.

This aspect will be described below. While the electrochemical element 1 is in operation, gas is supplied from the back side of the metal substrate 2 via the through holes 21 to the electrode layer 3. At the part having the second portion 42, it is possible to suppress the leakage of gas without providing another member such as a gasket. Note that, although the periphery of the electrode layer 3 is completely covered by the second portion 42 in the first embodiment, a configuration is also possible in which the upper side of the electrode layer 3 is provided with the electrolyte layer 4, and the periphery thereof is provided with gaskets or the like.

As a material for forming the electrolyte layer 4, YSZ (yttria-stabilized zirconia), SSZ (scandium-stabilized zirconia), GDC (gadolinium-doped ceria), or the like can be used. In particular, a zirconia-based ceramic is preferably used. If the electrolyte layer 4 is made of a zirconia-based ceramic, the temperature during operation of the electrochemical element 1 can be made to be higher than that of a ceria-based ceramic. For example, if the electrochemical element 1 is used in an SOFC, the SOFC is configured to include an electrolyte layer 4 that is made of a material such as YSZ and that can be used in a high-temperature range at approximately 650° C. or higher, and a system configuration is used in which a hydrocarbon-based gas such as town gas or LPG is used as a raw fuel of the system, and anode gas of the SOFC is obtained from the raw fuel through steam reforming or the like. With this configuration, heat generated in the SOFC cell stack can be used for reforming of the raw fuel gas, and thus it is possible to build an efficient SOFC system.

The electrolyte layer 4 is preferably formed using a low-temperature sintering method (e.g., wet method using sintering in a low-temperature range without performing sintering in a high-temperature range at 1400° C., etc.), an aerosol deposition method, a flame gunning method (thermal spraying method), or the like. With these sorts of film-formation processes that can be used in a low-temperature range, for example, it is possible to obtain a dense and highly-gastight electrolyte layer 4 without performing sintering in a high-temperature range at 1400° C., etc. Thus, the mutual diffusion of elements between the metal substrate 2 and the electrode layer 3 can be suppressed, and it is possible to realize an electrochemical element that has excellent durability.

The electrolyte layer 4 is configured so as to be dense in order to maintain the gastightness. The electrolyte layer preferably includes an electrolyte layer having a relative density of 90% or more, more preferably includes an electrolyte layer having a relative density of 95% or more, and even more preferably includes an electrolyte layer having a relative density of 98% or more. If the electrolyte layer has a high relative density in this manner, the electrolyte layer can be made to be dense. The relative density refers to a proportion of the density of the actually formed electrolyte layer 4 relative to the theoretical density of an electrolyte material. Alternatively, part of the electrolyte layer that is formed over the electrode layer may include a dense electrolyte layer.

Solid Oxide Fuel Cell (SOFC) 100

Figure 2:
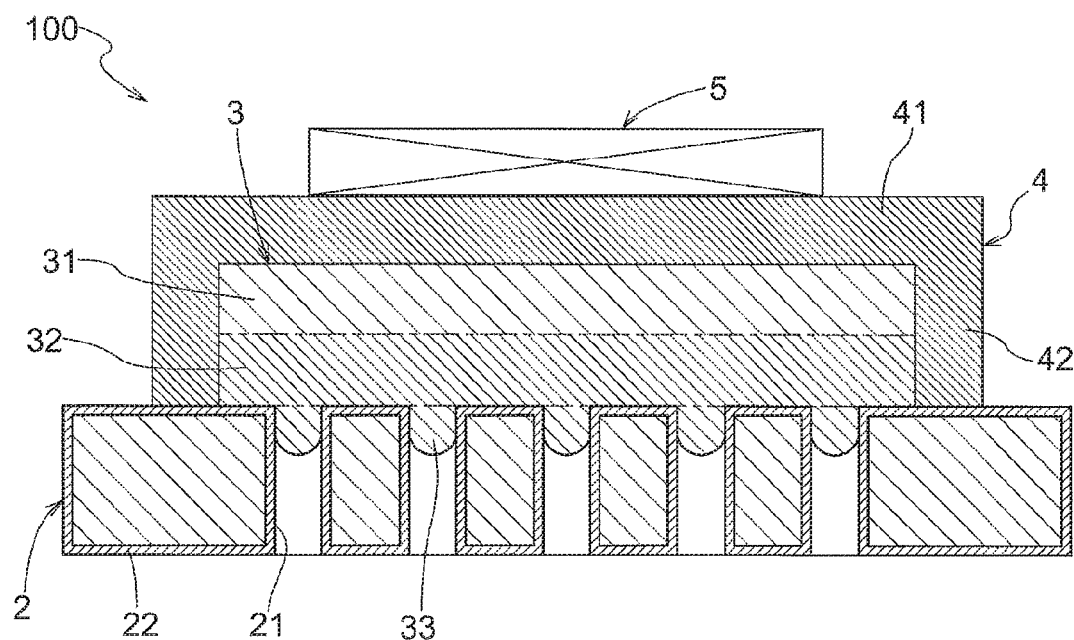
FIG. 2 is a cross-sectional view showing the configuration of a solid oxide fuel cell.

The structure in which a counter electrode layer 5 functioning as a counter electrode of the electrode layer 3 is provided over the electrolyte layer 4 of the thus configured electrochemical element 1 as shown in FIG. 2 can be used as the solid oxide fuel cell 100 that operates as follows. As a material for forming the counter electrode layer 5 functioning as a counter electrode of the electrode layer 3, for example, a complex oxide such as LSCF or LSM can be used. The counter electrode layer 5 is preferably formed using a low-temperature sintering method (e.g., wet method using sintering in a low-temperature range without performing sintering in a high-temperature range at 1400° C., etc.), an aerosol deposition method, a flame gunning method (thermal spraying method), or the like. With these processes that can be used in a low-temperature range, for example, it is possible to obtain a good counter electrode layer 5 without performing sintering in a high-temperature range at 1400° C., etc. Thus, this configuration is preferable because it is possible to realize an electrochemical element that has excellent durability, in which the metal substrate 2 is not damaged, and mutual diffusion of elements between the metal substrate 2 and the electrode layer 3 can be suppressed. Furthermore, the low-temperature sintering method is more preferably used because it is easy to handle the raw materials.

If an SOFC is configured in this manner, for example, fuel gas containing hydrogen is supplied from the back face of the metal substrate 2 via the through holes 21 to the electrode layer 3, air is supplied to the counter electrode layer 5 functioning as a counter electrode of the electrode layer 3, and, for example, the operation temperature is kept at approximately 700° C. Thus, in the counter electrode layer 5, oxygen $O_2$ contained in air reacts with an electron $e^-$, and thus an oxygen ion $O^{2-}$ is produced. The oxygen ion $O^{2-}$ moves through the electrolyte layer 4 to the electrode layer 3. In the electrode layer 3, hydrogen $H_2$ contained in the supplied fuel gas reacts with the oxygen ion $O^{2-}$, and water $H_2O$ and an electron $e^-$ are produced. Through these reactions, an electromotive force is generated between the electrode layer 3 and the counter electrode layer 5. In this case, the electrode layer 3 functions as a fuel electrode (anode) of the fuel cell stack, and the counter electrode layer 5 functions as an air electrode (cathode).

Method for Producing Electrochemical Element 1

Next, the method for producing the electrochemical element 1 will be described.

Electrode Layer Forming Step

In the electrode layer forming step, the electrode layer 3 is formed in a region larger than the region, of the front face of the metal substrate 2, in which the through holes 21 are provided. The electrode layer forming step may include a preliminary applying step, a pushing and wiping step, and a main applying step (that may further include a plurality of steps consisting of a first forming step, a second forming step, and the like). Furthermore, the preliminary applying step and the pushing and wiping step may be omitted such that the electrode layer forming step includes only the main applying step.

Note that the through holes of the metal substrate 2 can be provided by performing laser processing or the like.

Preliminary Applying Step

In the preliminary applying step, electrode layer material paste containing a material for forming the electrode layer 3 is applied to the front face of the metal substrate 2. First, paste in which a powder of a material for forming the electrode layer 3, which is a cermet material, is mixed in organic solvent is formed. Next, the formed paste is added dropwise or applied to the region, of the metal substrate 2, in which the through holes 21 are provided. At this time, part of the paste flows into the through holes 21 as per the capillary phenomenon.

Pushing and Wiping Step

In the following pushing and wiping step, the paste on the surface of the metal substrate 2 is wiped by a blade or the like. That is to say, the paste is pushed into the through holes 21, and the paste remaining on the front face of the metal substrate 2 is wiped away. Accordingly, the through holes 21 are filled (blocked) with the paste, and excessive paste is removed from the surface of the metal substrate 2, and thus the surface of the metal substrate 2 becomes smooth. That is to say, the through holes 21 of the metal substrate 2 are filled with the electrode layer material paste. After the pushing and wiping step is performed, the metal substrate 2 may be dried.

Note that the preliminary applying step and the pushing and wiping step may be performed together by selecting appropriate paste and setting various conditions as appropriate and using a screen printing method.

Main Applying Step/First Forming Step

In the following main applying step (first forming step), paste having a solvent dilution ratio lower than that of the electrode layer material paste used in the preliminary applying step can be used. That is to say, the solvent dilution ratio of the electrode layer material paste used in the preliminary applying step may be higher than the solvent dilution ratio of the electrode layer material paste used in the main applying step. The paste is applied to a region larger than the region, of the metal substrate 2, in which the through holes 21 are provided. The application is performed, for example, by using a spray blowing method or a screen printing method to a uniform thickness. With the first forming step, the first layer 32 (lower part) of the electrode layer 3 is formed.

If the preliminary applying step, the pushing and wiping step, and the main applying step are performed in the electrode layer forming step, it is possible to form an electrode layer 3 that has a smooth upper face while forming the insertion portions 33 that are inserted into the through holes 21 of the metal substrate 2 and block the through holes 21. Thus, a dense electrolyte layer 4 can be formed over the electrode layer 3, and an electrochemical element 1 that has superior robustness can be produced. Furthermore, the electrolyte layer 4 can be formed through a low-temperature process such as a low-temperature sintering method, an aerosol deposition method, or a flame gunning method (thermal spraying method) over the obtained smooth electrode layer 3, and an electrochemical element 1 that has excellent durability can be produced because heat treatment at a high temperature is not performed.

Furthermore, the solvent dilution ratio of the electrode layer material paste used in the preliminary applying step may be higher than the solvent dilution ratio of the electrode layer material paste used in the main applying step. Accordingly, in the preliminary applying step, electrode layer material paste having a high solvent dilution ratio can be applied to the surface of the metal substrate 2, and thus the material for forming the electrode layer 3 is likely to enter into the through holes 21 of the metal substrate 2. Accordingly, the through holes 21 can be more reliably filled (blocked) with the electrode layer material, and an electrode layer 3 having a smoother surface can be obtained. That is to say, a denser electrolyte layer 4 can be formed over the electrode layer 3, and an electrochemical element 1 that has superior robustness can be produced. Furthermore, the electrolyte layer 4 can be formed through a low-temperature process such as a low-temperature sintering method, an aerosol deposition method, or a flame gunning method (thermal spraying method) on the obtained smooth electrode layer 3, and an electrochemical element 1 that has excellent durability can be produced because heat treatment at a high temperature is not performed.

Main Applying Step/Second Forming Step

In the following second forming step, paste having a cermet aggregate mixed proportion higher than that of the electrode layer material paste used in the first forming step can be used. The paste can be applied in an overlapping manner to the region to which the paste was applied in the first forming step. The application is performed, for example, by using a spray blowing method or a screen printing method to a uniform thickness. With the second forming step, the second layer 31 (upper part) of the electrode layer 3 can be formed.

If the second forming step of, after the first forming step, forming the electrode layer 3 using an electrode layer material in which the aggregate mixed proportion is a second proportion, which is higher than a first proportion, is performed, the aggregate mixed proportion can be made to be higher in the upper portion in the electrode layer 3 than in the lower portion. Accordingly, it is possible to increase the strength and the density of the upper portion in the electrode layer 3, and to form the electrolyte layer 4 at a low temperature and ensure the gas permeability of the electrode layer 3. Accordingly, an electrochemical element 1 whose robustness and durability are increased can be produced.

Note that the main applying step may include only the first forming step, or may further include a third and subsequent forming steps of the same type. It is also possible to omit the preliminary applying step and the pushing and wiping step by preferably adjusting the electrode layer material paste for use in the main applying step. Furthermore, in the main applying step, degreasing treatment of performing heating at a temperature of approximately 400° C. to 450° C. may be performed after the electrode layer 3 is applied onto the metal substrate 2.

Sintering Step

The main applying step is followed by a sintering step of heating the metal substrate 2 on which the electrode layer 3 is formed, thereby sintering the electrode layer 3 and forming the metal oxide film 22 on the surface of the metal substrate 2. The sintering step is performed, for example, through heating at 800° C. to 1100° C. in a mixture gas atmosphere adjusted by humidifying mixture gas of hydrogen and nitrogen. If the sintering step is performed in these conditions, the thickness of the metal oxide film 22 can be set to a preferable thickness of the submicron order. An excessively thick metal oxide film 22 is problematic in that the electrical resistance of the metal substrate 2 becomes too large, and the metal oxide film 22 becomes fragile. On the other hand, an excessively thin metal oxide film 22 is also problematic in that the effect of suppressing mutual diffusion of elements between the metal substrate 2 and the electrode layer 3 becomes insufficient. Thus, for example, the average thickness of the metal oxide film 22 is preferably approximately 0.3 µm or more and 0.7 µm or less. Furthermore, the minimum film thickness is preferably about 0.1 µm or more. The maximum film thickness is preferably about 1.1 µm or less.

If the above-described sintering step is performed after the electrode layer forming step is performed, sintering of the electrode layer 3 and formation of the metal oxide film 22 can be performed together. Since the electrode layer 3 is gas-permeable, the metal oxide film 22 is formed on the surface of the metal substrate 2 on faces thereof exposed to the outside, faces (interfaces) thereof in contact with the electrode layer 3, and inner faces of the through holes 21. With the metal oxide film 22, the mutual diffusion of elements between the metal substrate 2 and the electrode layer 3 can be suppressed. Thus, it is possible to simplify the production process because an additional element diffusion preventing layer does not have to be provided.

Furthermore, it is desirable that the sintering step is performed under conditions adjusted to an oxygen partial pressure of $1.0 \times 10^{-20}$ atm or more and $5.0 \times 10^{-15}$ atm or less. If the sintering is performed in an environment having low oxygen partial pressure in this manner, it is possible to form a metal oxide film 22 that has an appropriate and uniform thickness and that is dense and is not likely to peel off, and to produce an electrochemical element 1 that can more effectively suppress the mutual diffusion of elements. Note that an excessively thin metal oxide film 22 may result in an insufficient function regarding mutual diffusion of elements between the metal substrate 2 and the electrode layer 3, whereas an excessively thick metal oxide film 22 may allow defects such as cracks to occur in the metal oxide film 22 and adversely affect the strength of the metal oxide film 22, or may increase the electrical resistance of the metal oxide film 22 and reduce the performance of the electrochemical element. Thus, it is preferable that the metal oxide film 22 is formed to have an appropriate film thickness.

Furthermore, it is desirable that the sintering step is performed in mixture gas adjusted by humidifying mixture gas of hydrogen and nitrogen. If the heating is performed in such a mixture gas atmosphere to the sintering temperature, the atmosphere has a very low oxygen partial pressure, and it is possible to form a metal oxide film 22 that is thin and dense and is not likely to peel off, and to produce an electrochemical element 1 that can more reliably suppress the mutual diffusion of elements.

The sintering step is performed through heating at 800° C. to 1100° C. In particular, the heating is performed preferably at 1050° C. or lower, and more preferably at 1000° C. or lower. If the temperature of the mixture gas is higher than 1100° C., the oxygen partial pressure may become large, and mutual diffusion of elements between the metal substrate 2 and the electrode layer 3 may increase. On the other hand, if the sintering temperature is lower than 800° C., the strength of the electrode layer 3 may be insufficient, or the metal oxide film 22 may be too thin, and thus the function of suppressing mutual diffusion of elements between the metal substrate 2 and the electrode layer 3 may be insufficient. Accordingly, if the sintering step is performed at 800° C. to 1100° C., it is possible to form an electrode layer having an appropriate strength and density while forming the metal oxide film 22 having an appropriate thickness, and to produce an electrochemical element 1 that has excellent durability.

Furthermore, the sintering step may further include a step of, after sintering is performed under conditions adjusted to an oxygen partial pressure of $1.0 \times 10^{-20}$ atm or more and $5.0 \times 10^{-15}$ atm or less, performing sintering again under conditions (e.g., in air, etc.) in which the oxygen partial pressure is higher than $5.0 \times 10^{-15}$ atm. With this configuration, first, a metal oxide film 22 having an appropriate thickness is formed under conditions adjusted to an oxygen partial pressure of $1.0 \times 10^{-20}$ atm or more and $5.0 \times 10^{-15}$ atm or less, after which a sintering step is additionally performed with a higher oxygen partial pressure. Accordingly, it is possible to increase the strength of the electrode layer 3 while suppressing an increase in the thickness of the metal oxide film 22 and an increase in the electrical resistance of the metal substrate 2. Thus, after this step, it is easier to form the electrolyte layer 4 using a low-temperature process such as a low-temperature sintering method, an aerosol deposition method, or a flame gunning method (thermal spraying method). In particular, methods that may have an impact on the electrode layer 3 functioning as a base layer, such as an aerosol deposition method and a flame gunning method (thermal spraying method), can be applied in the formation of the electrolyte layer 4.

Electrolyte Layer Forming Step

After the sintering step, that is, after the electrode layer forming step, the electrolyte layer forming step is performed. In the electrolyte layer forming step, an electrolyte material, which is a material for forming the electrolyte layer 4, is affixed to an area extending over the electrode layer 3 and the front face of the metal substrate 2, so that the electrolyte layer 4 having the first portion 41 coating the electrode layer 3 and the second portion 42 that is in contact with the front face of the metal substrate 2 can be formed.

The electrolyte layer forming step is preferably performed using a low-temperature sintering method (e.g., wet method using sintering in a low-temperature range without performing sintering in a high-temperature range at 1400° C., etc.), an aerosol deposition method, a flame gunning method (thermal spraying method), or the like. With these methods, it is possible to produce a dense and highly-gastight electrochemical element without performing heat treatment at a high temperature. Thus, it is possible to suppress the mutual diffusion of elements between the metal substrate 2 and the electrode layer 3 without providing an additional diffusion preventing layer, and to realize an electrochemical element that has excellent durability.

Method for Producing Solid Oxide Fuel Cell/Counter Electrode Layer Forming Step

The solid oxide fuel cell 100 can be produced by performing a counter electrode layer forming step of forming the counter electrode layer 5 functioning as a counter electrode of the electrode layer 3, over the electrolyte layer 4 of the electrochemical element 1 produced in the above-described step. The counter electrode layer forming step can be performed by using a low-temperature sintering method (e.g., wet method using sintering in a low-temperature range without performing sintering in a high-temperature range at 1400° C., etc.), an aerosol deposition method, a flame gunning method (thermal spraying method), or the like, using a powder of a material (a complex oxide such as LSCF or LSM) for forming the counter electrode layer 5 functioning as a counter electrode of the electrode layer 3.

Second Embodiment

Although the electrochemical element 1 was used in the solid oxide fuel cell 100 in the above-described first embodiment, the electrochemical element 1 can be used in solid oxide electrolysis cells, oxygen sensors that use solid oxides, and the like.

Third Embodiment

Although the solid oxide fuel cell 100 in which an anode electrode was formed as the electrode layer 3 and a cathode electrode was formed as the counter electrode layer 5 was used in the foregoing embodiment, a configuration can also be used in which a cathode electrode is formed as the electrode layer 3 and an anode electrode is formed as the counter electrode layer 5.

Fourth Embodiment

In the above-described first embodiment, as shown in FIG. 1 or 2, the electrolyte layer 4 was arranged on a face on the upper side of the electrode layer 3. Furthermore, the counter electrode layer 5 was arranged on a face on the upper side of the electrolyte layer 4. This configuration may be changed such that, as shown in FIG. 3, a buffer layer 6 is provided between the electrode layer 3 and the electrolyte layer 4. Furthermore, a reaction preventing layer (not shown) may be provided between the electrolyte layer 4 and the counter electrode layer 5.

Buffer Layer 6

As a material for forming the buffer layer 6, an oxygen ion (oxide ion)-conductive material is preferable, and examples thereof include YSZ (yttria-stabilized zirconia), SSZ (scandium-stabilized zirconia), GDC (gadolinium-doped ceria), YDC (yttrium-doped ceria), SDC (samarium-doped ceria), and the like. In particular, if a ceria-based ceramic is used, the buffer layer 6 has mixed conductivity to provide high element performance, which is preferable. The buffer layer 6 is preferably formed using a low-temperature sintering method (e.g., wet method using sintering in a low-temperature range without performing sintering in a high-temperature range at a temperature higher than 1100° C.), an aerosol deposition method, a flame gunning method, or the like (buffer layer forming step). In particular, the low-temperature sintering method is preferably used because it is easy to handle the raw materials. The relative density of the buffer layer 6 is preferably smaller than that of the electrolyte layer 4. Furthermore, the relative density of the buffer layer 6 is preferably larger than that of the electrode layer 3. This configuration is preferable because resistance against various types of stress such as element heat shock can be improved.

Reaction Preventing Layer

As a material for forming the reaction preventing layer, any material may be used as long as a reaction between components of the electrolyte layer 4 and components of the counter electrode layer 5 can be prevented. For example, a ceria-based material and the like are used. If the reaction preventing layer is installed between the electrolyte layer 4 and the counter electrode layer 5, a reaction between constituent materials of the counter electrode layer 5 and constituent materials of the electrolyte layer 4 is effectively suppressed, and the long-term stability of the element performance can be improved. The reaction preventing layer can be formed by using, as appropriate, a low-temperature sintering method (e.g., wet method using sintering in a low-temperature range without performing sintering in a high-temperature range at a temperature higher than 1100° C.), an aerosol deposition method, a flame gunning method, a sputtering method, a pulsed laser deposition, or the like (reaction preventing layer forming step). In particular, the low-temperature sintering method, the aerosol deposition method, the flame gunning method, and the like are preferable because it is possible to realize a low-cost element. Furthermore, the low-temperature sintering method is more preferably used because it is easy to handle the raw materials.

Fifth Embodiment

In the above-described fourth embodiment, as shown in FIG. 3, both the electrode layer 3 and the electrolyte layer 4 are provided in a region, on the front face of the metal substrate 2, larger than the region in which the through holes 21 are provided.

The entire region in which the through holes 21 are provided is covered by the electrode layer 3 and the electrolyte layer 4.

That is to say, the through holes 21 are formed, passing through the metal substrate 2, inside the region in which the electrode layer 3 is formed and inside the region in which the electrolyte layer 4 is formed. In other words, all through holes 21 are provided so as to be open to the electrode layer 3. This configuration may be changed to a configuration shown in FIG. 4.

In the configuration shown in FIG. 4, the electrode layer 3 is provided in a region smaller than the region in which the through holes 21 are provided. The buffer layer 6 and the electrolyte layer 4 are provided in a region larger than the region in which the through holes 21 are provided. The entire region in which the through holes 21 are provided is covered by the buffer layer 6 and the electrolyte layer 4. That is to say, the through holes 21 are provided inside and outside the region in which the electrode layer 3 is formed. Furthermore, the through holes 21 are provided inside the region in which the electrolyte layer 4 is formed. In other words, the through holes 21 are provided so as to be open to both the electrode layer 3 and the buffer layer 6. As shown in FIG. 4, the electrode layer 3 may include the insertion portions 33 that are inserted into the through holes 21 of the metal substrate 2 and block the through holes 21. The buffer layer 6 may include insertion portions 61 that are inserted into the through holes 21 of the metal substrate 2 and block the through holes 21. The insertion portions 33 and the insertion portions 61 can be provided in a state of being inserted into the through holes 21 to a depth of approximately several micrometers to several tens of micrometers.

Sixth Embodiment

Figure 5:
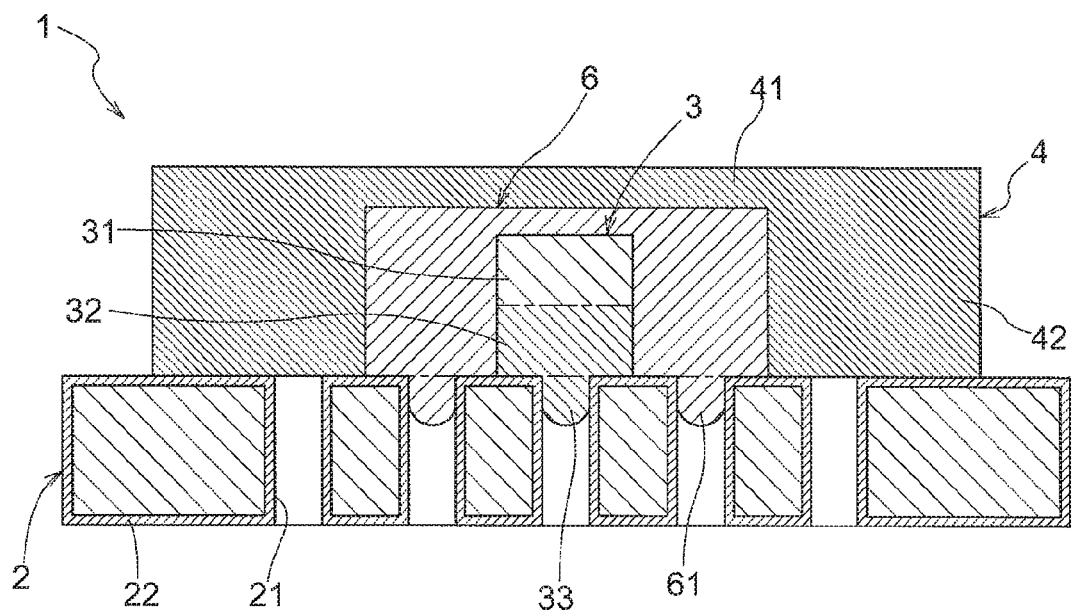
FIG. 5 is a cross-sectional view showing the configuration of an electrochemical element.

The configuration shown in FIG. 5 is also possible. In the configuration shown in FIG. 5, the electrode layer 3 and the buffer layer 6 are provided in a region smaller than the region in which the through holes 21 are provided. The electrolyte layer 4 is provided in a region larger than the region in which the through holes 21 are provided. The entire region in which the through holes 21 are provided is covered by the electrolyte layer 4. That is to say, the through holes 21 are provided inside and outside the region in which the electrode layer 3 is formed. The through holes 21 are provided inside and outside the region in which the buffer layer 6 is formed. Furthermore, the through holes 21 are provided inside the region in which the electrolyte layer 4 is formed. In other words, the through holes 21 are provided so as to be open to the electrode layer 3, the buffer layer 6, and the electrolyte layer 4. The buffer layer 6 may include the insertion portions 61 that are inserted into the through holes 21 of the metal substrate 2 and block the through holes 21. Furthermore, the electrolyte layer 4 may include insertion portions (not shown) that are inserted into the through holes 21 of the metal substrate 2 and block the through holes 21.

Seventh Embodiment

Figure 6:
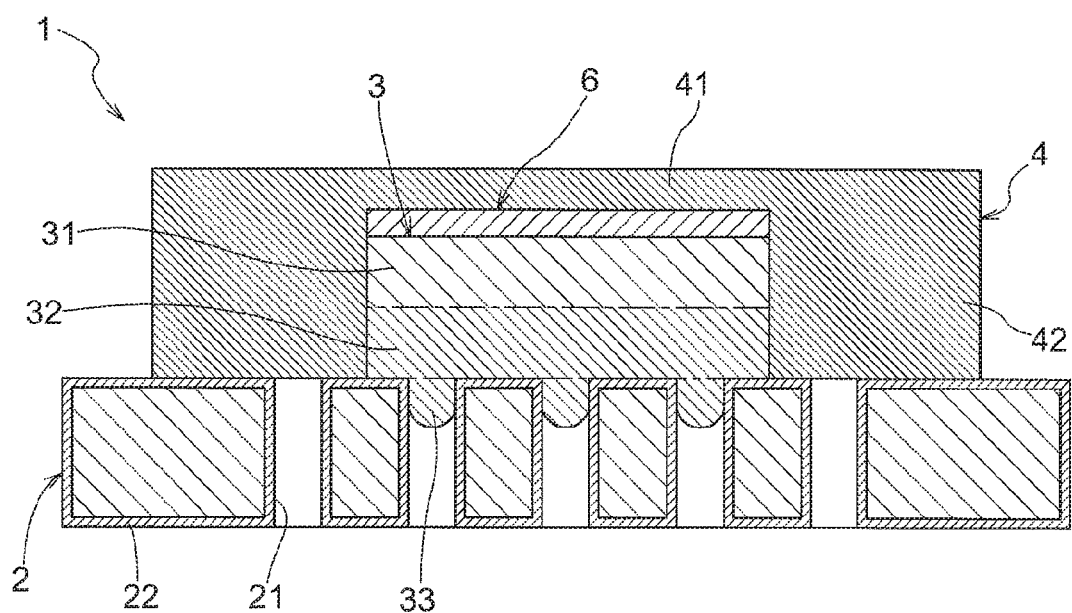
FIG. 6 is a cross-sectional view showing the configuration of an electrochemical element.

The configuration shown in FIG. 6 is also possible. In the configuration shown in FIG. 6, the electrode layer 3 and the buffer layer 6 are provided in a region smaller than the region in which the through holes 21 are provided. The buffer layer 6 is provided in the region in which the electrode layer 3 is provided. The electrolyte layer 4 is provided in a region larger than the region in which the through holes 21 are provided. The entire region in which the through holes 21 are provided is covered by the electrolyte layer 4.

That is to say, the through holes 21 are provided inside and outside the region in which the electrode layer 3 is formed. Furthermore, the through holes 21 are provided inside the region in which the electrolyte layer 4 is formed. In other words, the through holes 21 are provided so as to be open to the electrode layer 3 and the electrolyte layer 4. The electrolyte layer 4 may include insertion portions (not shown) that are inserted into the through holes 21 of the metal substrate 2 and block the through holes 21.

Eighth Embodiment

In the foregoing embodiment, for example, a cermet material such as NiO—GDC, Ni—GDC, NiO—YSZ, Ni—YSZ, CuO—$CeO_2$, or Cu—$CeO_2$ was used as the material for forming the electrode layer 3, and for example, a complex oxide such as LSCF or LSM was used as the material for forming the counter electrode layer 5. The electrochemical element 1 was used in the solid oxide fuel cell 100 in which the electrode layer 3 functioned as a fuel electrode to which hydrogen gas was supplied and the counter electrode layer 5 functioned as an air electrode to which air was supplied. This configuration may be changed such that the electrochemical element 1 has a configuration in which the electrode layer 3 functions as an air electrode and the counter electrode layer 5 functions as a fuel electrode. That is to say, for example, a complex oxide such as LSCF or LSM is used as the material for forming the electrode layer 3, and, for example, a cermet material such as NiO—GDC, Ni—GDC, NiO—YSZ, Ni—YSZ, CuO—$CeO_2$, or Cu—$CeO_2$ is used as the material for forming the counter electrode layer 5. With the thus configured electrochemical element 1, the electrochemical element 1 can be used in the solid oxide fuel cell 100 in which the electrode layer 3 functions as an air electrode to which air is supplied and the counter electrode layer 5 functions as a fuel electrode to which hydrogen gas is supplied.

The configurations disclosed in the foregoing embodiments can be used in combination with configurations disclosed in other embodiments, as long as there are no contradictions. The embodiments disclosed in this specification are, in all respects, illustrative and not limiting. Various modifications may be made without departing from the gist of the invention.

Example 1

A plurality of through holes 21 were formed by performing laser processing in a region within a 7.5 mm radius from the center of a circular crofer22APU plate having a thickness of 0.3 mm and a diameter of 25 mm, and thus a metal substrate 2 was obtained. At this time, the through holes were formed by performing laser processing such that the through holes each had a diameter of approximately 10 to 15 μm on the surface of the metal substrate 2.

Next, 70% by weight of NiO powder and 30% by weight of GDC powder were mixed, and an organic binder and an organic solvent (dispersion medium) were added thereto, to obtain a paste, which was then added dropwise to the region in which the through holes of the metal substrate 2 were formed (preliminary applying step). Then, the paste on the surface of the metal substrate 2 was wiped and rubbed into the through holes (pushing and wiping step).

Next, 70% by weight of NiO powder and 30% by weight of GDC powder were mixed, and an organic binder and an organic solvent were added thereto, to obtain a paste, which was then applied to form an electrode layer 3 by using a spray blowing method in a region within a 8 mm radius from the center of the metal substrate 2. Note that the paste used at this time was obtained by reducing the amount of organic solvent added, by about 6%, from the amount used in the preliminary applying step. Subsequently, degreasing treatment was performed in air at 450° C. (main applying step).

Next, the metal substrate 2 onto which the electrode layer 3 was applied was fired for one hour in an $H_2/H_2O/N_2$ mixture gas atmosphere adjusted to an oxygen partial pressure of $2.3\times10^{-19}$ atm at 850° C. (sintering step).

Subsequently, an organic binder and an organic solvent were added to GDC powder, to obtain a paste, which was then applied to form an electrolyte layer 4 on the entire metal substrate 2 by using a spray blowing method, after which sintering was performed for two hours in an $H_2/H_2O/N_2$ mixture gas atmosphere adjusted to an oxygen partial pressure of $1.7\times10^{-15}$ atm at 1050° C., and thus an electrolyte layer 4 was formed (formation of the electrolyte layer 4 using a low-temperature sintering method).

Subsequently, 60% by weight of LSCF powder and 40% by weight of GDC powder were mixed, and an organic binder and an organic solvent were added thereto, to obtain a paste, which was then applied to form a counter electrode layer 5 by using a spray blowing method in a region within a 7 mm radius from the center of the electrolyte layer 4, after which sintering was performed for one hour at 850° C. in air, and thus a counter electrode layer 5 was formed (formation of the counter electrode layer 5 using a low-temperature sintering method).

Electrochemical measurements using hydrogen and air on the thus obtained solid oxide fuel cell showed that a significant voltage higher than 0.2 V was obtained.

Comparative Example 1

A solid oxide fuel cell was produced likewise to Example 1 above, except that the preliminary applying step and the pushing and wiping step were not performed, and insertion portions that block the through holes were not provided. Electrochemical measurements using hydrogen and air on the thus obtained solid oxide fuel cell showed that the gastightness of the electrolyte layer was not maintained, and there was no potential difference.

It is seen from the results in Example 1 and Comparative Example 1 above that a good electrolyte layer 4 is formed by providing insertion portions that block through holes.

Example 2

A circular crofer22APU plate having a thickness of 0.3 mm and a diameter of 25 mm was subjected to laser processing such that a plurality of through holes 21 were formed in a region within a 2.5 mm radius from the center, and thus a metal substrate 2 was obtained. At this time, the through holes were formed by performing laser processing such that the through holes each had a diameter of approximately 10 to 15 μm on the surface of the metal substrate 2.

Next, 60% by weight of NiO powder and 40% by weight of GDC powder were mixed, and an organic binder and an organic solvent were added thereto, to obtain a paste, which was then added dropwise to the region in which the through holes of the metal substrate 2 were formed (preliminary applying step). Then, the paste on the surface of the metal substrate 2 was wiped and rubbed into the through holes (pushing and wiping step).

Next, 60% by weight of NiO powder and 40% by weight of GDC powder were mixed, and an organic binder and an organic solvent were added thereto, to obtain a paste, which was then applied to form an electrode layer 3 by using a spray blowing method in a region within a 3.5 mm radius from the center of the metal substrate 2. Subsequently, degreasing treatment was performed in air at 450° C. (main applying step).

Next, the metal substrate 2 onto which the electrode layer 3 was applied was fired for 30 minutes in an $H_2/H_2O/N_2$ mixture gas atmosphere adjusted to an oxygen partial pressure of $4.1 \times 10^{-17}$ atm at 1050° C. Subsequently, the metal substrate 2 was fired for another 15 minutes in an $O_2/H_2O/N_2$ mixture gas atmosphere adjusted to $pO_2=2.0 \times 10^{-2}$ atm at 1050° C. (sintering step).

Subsequently, an 8YSZ (yttria-stabilized zirconia) powder having a mode diameter of about 0.7 μm was aerosolized in dry air at a flow rate of 6 L/min. The aerosol was introduced into a chamber at a pressure of 190 Pa, and an electrolyte layer 4 was formed by spraying this aerosol over a range of 10 mm×15 mm onto the metal substrate 2 on which the electrode layer 3 was arranged, so as to cover the electrode layer, without heating, and thus an electrochemical element 1 was obtained.

Figure 11:
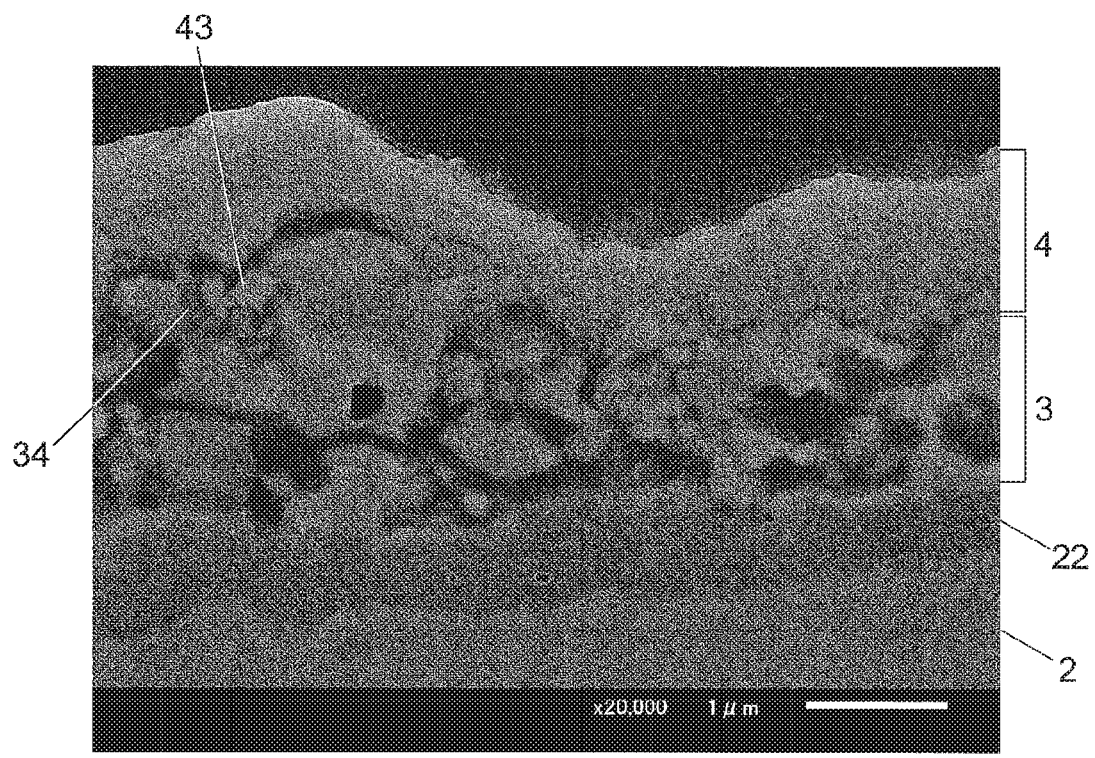
FIG. 11 is an electron micrograph of a cross-section of an electrochemical element.

FIG. 11 shows an SEM image of a cross-section of the thus obtained electrochemical element 1. It is seen from FIG. 11 that the thickness of the metal oxide film 22 was approximately 0.4 to 0.6 μm. Furthermore, it is seen that a dense electrolyte layer 4 was formed on a porous electrode layer 3.

Furthermore, measurements showed that the hydrogen gas permeability (hydrogen leakage amount) of the obtained electrochemical element 1 was lower than the detection limit ($4.9 \times 10^{-9}$ mol/m$^2$ sPa or less).

Reference Example 1

The metal substrate 2 on which the electrode layer 3 was arranged was produced likewise to Example 2 above, except that the electrolyte layer 4 was not formed. Measurements showed that the hydrogen gas permeability (hydrogen leakage amount) of the obtained electrochemical element 1 was $1.1 \times 10^2$ mol/m$^2$ sPa.

It is seen from the results in Example 2 and Reference Example 1 above that the electrode layer 3 was gas-permeable (hydrogen-permeable) and the electrolyte layer 4 was dense and had sufficient gastightness.

Reference Example 2

A circular crofer22APU plate having a thickness of 0.3 mm and a diameter of 25 mm was used as the metal substrate 2, and 60% by weight of NiO powder and 40% by weight of GDC powder were mixed, and an organic binder and an organic solvent were added thereto, to obtain a paste, which was then applied to form an electrode layer 3 by using a screen printing method in a region within a 17 mm diameter on the metal substrate 2. Subsequently, degreasing treatment was performed in air at 450° C. (main applying step).

Next, the metal substrate 2 onto which the electrode layer 3 was applied was fired for one hour in an $H_2/H_2O/N_2$ mixture gas atmosphere adjusted to an oxygen partial pressure of $7.0 \times 10^{-20}$ atm at 850° C. (sintering step), to produce an electrochemical element 1.

Measurements on the electrochemical element 1 produced in Reference Example 2 showed that the electrical resistance in the thickness direction of the metal oxide film 22 in the metal substrate 2 was about 11 mΩ·cm$^2$.

Furthermore, X-ray diffraction measurements on the electrochemical element 1 produced in Reference Example 2 from the surface of the electrode layer 3 showed that peaks corresponding to Ni and CeO$_2$ derived from components of the electrode layer 3 and Fe derived from components of the metal substrate 2 were observed.

Reference Example 3

An electrochemical element 1 was produced likewise to Reference Example 1, except that the metal substrate 2 onto which the electrode layer 3 was applied was fired for one hour in an $H_2/H_2O/N_2$ mixture gas atmosphere adjusted to an oxygen partial pressure of $7.0 \times 10^{-20}$ atm at 850° C., and then was further fired for 30 minutes at 850° C. in air (sintering step).

Measurements on the electrochemical element 1 produced in Reference Example 3 showed that the electrical resistance in the thickness direction of the metal oxide film 22 in the metal substrate 2 was about 15 mΩ·cm$^2$.

Furthermore, X-ray diffraction measurements on the electrochemical element 1 produced in Reference Example 3 from the surface of the electrode layer 3 showed that peaks corresponding to NiO and CeO$_2$ derived from components of the electrode layer 3 and Fe derived from components of the metal substrate 2 were observed.

Note that, tape tests regarding the strength of the electrode layer 3 performed on the electrochemical element 1 obtained in Reference Example 2 and the electrochemical element 1 obtained in Reference Example 3 showed that the surface layer of the electrode layer 3 did not peel off for the most part in the electrochemical element 1 of Reference Example 3, whereas approximately 50% of the surface layer of the electrode layer 3 peeled off in the electrochemical element 1 of Reference Example 2. Thus, it is seen that, if a metal oxide film 22 having an appropriate thickness is first formed under conditions adjusted to an oxygen partial pressure of $1.0 \times 10^{-20}$ atm or more and $5.0 \times 10^{-15}$ atm or less, after which a sintering step is additionally performed with a higher oxygen partial pressure, it is possible to increase the strength of the electrode layer 3 while suppressing an increase in the thickness of the metal oxide film 22 and an increase in the electrical resistance of the metal substrate 2.

Reference Example 4

An electrochemical element 1 was produced likewise to Reference Example 2, except that the metal substrate 2 onto which the electrode layer 3 was applied was fired for one hour in an $H_2/H_2O/N_2$ mixture gas atmosphere adjusted to an oxygen partial pressure of $5.1 \times 10^{-18}$ atm at 950° C.

Measurements on the electrochemical element 1 produced in Reference Example 4 showed that the electrical resistance in the thickness direction of the metal oxide film 22 in the metal substrate 2 was about 19 mΩ·cm$^2$.

Furthermore, X-ray diffraction measurements on the electrochemical element 1 produced in Reference Example 4 from the surface of the electrode layer 3 showed that peaks corresponding to Ni and CeO$_2$ derived from components of the electrode layer 3 and Fe derived from components of the metal substrate 2 were observed.

Figure 7:
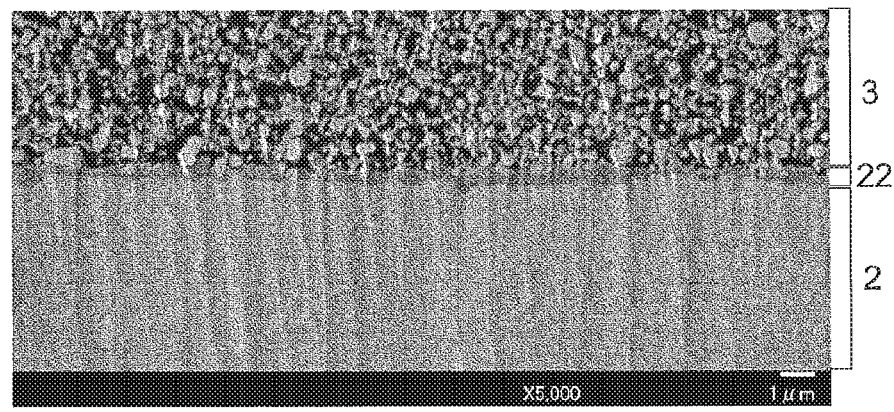
FIG. 7 is an electron micrograph of a cross-section of an electrochemical element.

Furthermore, FIG. 7 shows a result of SEM observation performed on a cross-section of the electrochemical element 1 produced in Reference Example 4. It is seen from FIG. 7 that the metal oxide film 22 had a minimum thickness of approximately 0.1 µm, a maximum thickness of approximately 0.7 µm, and an average thickness of approximately 0.3 µm. Furthermore, EPMA observation performed on a cross-section of the electrochemical element 1 produced in Reference Example 4 showed that the metal oxide film 22 was mainly made of chromium oxide. Furthermore, it was seen that diffusion of Cr and Fe in the metal substrate 2 to the electrode layer 3 and diffusion of Ni from the electrode layer 3 to the metal substrate 2 were suppressed by the metal oxide film 22.

Reference Example 5

An electrochemical element 1 was produced likewise to Reference Example 2, except that the metal substrate 2 onto which the electrode layer 3 was applied was fired for one hour in an $H_2/H_2O/N_2$ mixture gas atmosphere adjusted to an oxygen partial pressure of $5.1 \times 10^{-18}$ atm at 950° C., and then was further fired for 30 minutes at 950° C. in air (sintering step).

Measurements on the electrochemical element 1 produced in Reference Example 5 showed that the electrical resistance in the thickness direction of the metal oxide film 22 in the metal substrate 2 was about 23 mΩ·cm$^2$.

Furthermore, X-ray diffraction measurements on the electrochemical element 1 produced in Reference Example 5 from the surface of the electrode layer 3 showed that peaks corresponding to NiO and $CeO_2$ derived from components of the electrode layer 3 and Fe derived from components of the metal substrate 2 were observed.

Figure 8:
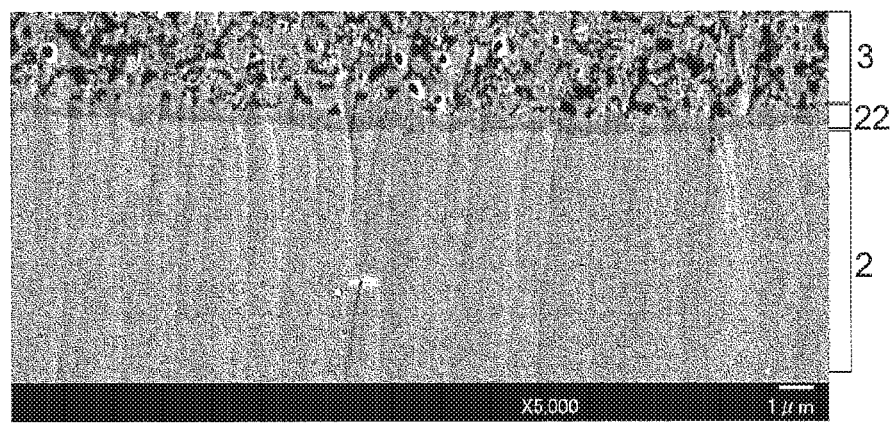
FIG. 8 is an electron micrograph of a cross-section of an electrochemical element.

Furthermore FIG. 8 shows a result of SEM observation performed on a cross-section of the electrochemical element 1 produced in Reference Example 5. As shown in FIG. 8, the metal oxide film 22 had a minimum thickness of approximately 0.2 µm, a maximum thickness of approximately 1.1 µm, and an average thickness of approximately 0.5 µm. Furthermore, EPMA observation performed on a cross-section of the electrochemical element 1 produced in Reference Example 5 showed that the metal oxide film 22 was mainly made of chromium oxide. Furthermore, it was seen that diffusion of Cr and Fe in the metal substrate 2 to the electrode layer 3 and diffusion of Ni from the electrode layer 3 to the metal substrate 2 were suppressed by the metal oxide film 22.

Reference Example 6

An electrochemical element 1 was produced likewise to Reference Example 2, except that the metal substrate 2 onto which the electrode layer 3 was applied was fired for 30 minutes in an $H_2/H_2O/N_2$ mixture gas atmosphere adjusted to an oxygen partial pressure of $4.1 \times 10^{-17}$ atm at 1050° C., and then was further fired for 15 minutes in an $O_2/H_2O/N_2$ mixture gas atmosphere adjusted to an oxygen partial pressure of $2.0 \times 10^{-2}$ atm at 1050° C. (sintering step).

Measurements on the electrochemical element 1 produced in Reference Example 6 showed that the electrical resistance in the thickness direction of the metal oxide film 22 in the metal substrate 2 was about 31 mΩ·cm$^2$.

Furthermore, X-ray diffraction measurements on the electrochemical element 1 produced in Reference Example 6 from the surface of the electrode layer 3 showed that peaks corresponding to NiO and $CeO_2$ derived from components of the electrode layer 3 and Fe derived from components of the metal substrate 2 were observed.

Figure 9:
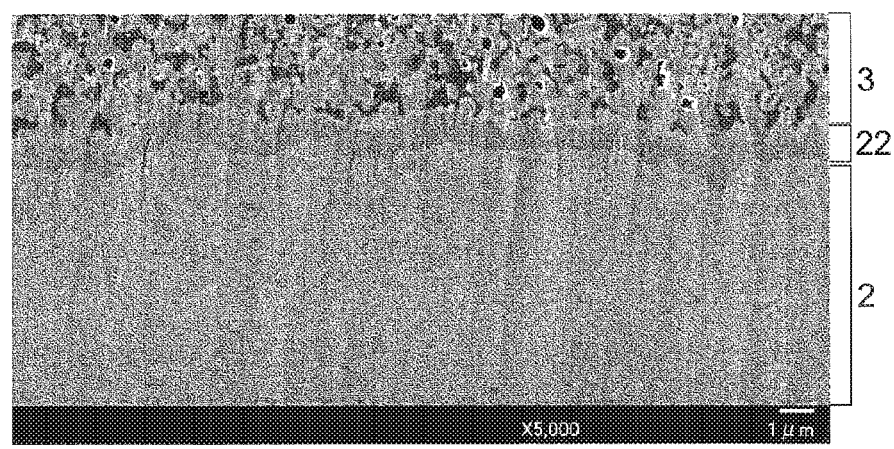
FIG. 9 is an electron micrograph of a cross-section of an electrochemical element.

Furthermore, FIG. 9 shows a result of SEM observation performed on a cross-section of the electrochemical element 1 produced in Reference Example 6. As shown in FIG. 9, the metal oxide film 22 had a minimum thickness of approximately 0.5 µm, a maximum thickness of approximately 1.0 µm, and an average thickness of approximately 0.67 µm. Furthermore, EPMA observation performed on a cross-section of the electrochemical element 1 produced in Reference Example 6 showed that the metal oxide film 22 was mainly made of chromium oxide. Furthermore, it was seen that diffusion of Cr and Fe in the metal substrate 2 to the electrode layer 3 and diffusion of Ni from the electrode layer 3 to the metal substrate 2 were suppressed by the metal oxide film 22.

Reference Example 7

An electrochemical element 1 was produced likewise to Reference Example 2, except that the metal substrate 2 onto which the electrode layer 3 was applied was fired for one hour in an $H_2/H_2O/N_2$ mixture gas atmosphere adjusted to an oxygen partial pressure of $7.3 \times 10^{-14}$ atm at 1150° C. (sintering step).

Measurements on the electrochemical element 1 produced in Reference Example 7 showed that the electrical resistance in the thickness direction of the metal oxide film 22 in the metal substrate 2 was about 2.2 Ω·cm$^2$ or more.

Furthermore, X-ray diffraction measurements on the electrochemical element 1 produced in Reference Example 7 from the surface of the electrode layer 3 showed that peaks corresponding to Ni and $CeO_2$ derived from components of the electrode layer 3 and Fe derived from components of the metal substrate 2 were observed. Also, a peak of $CeCrO_3$ complex oxide was observed.

Figure 10:
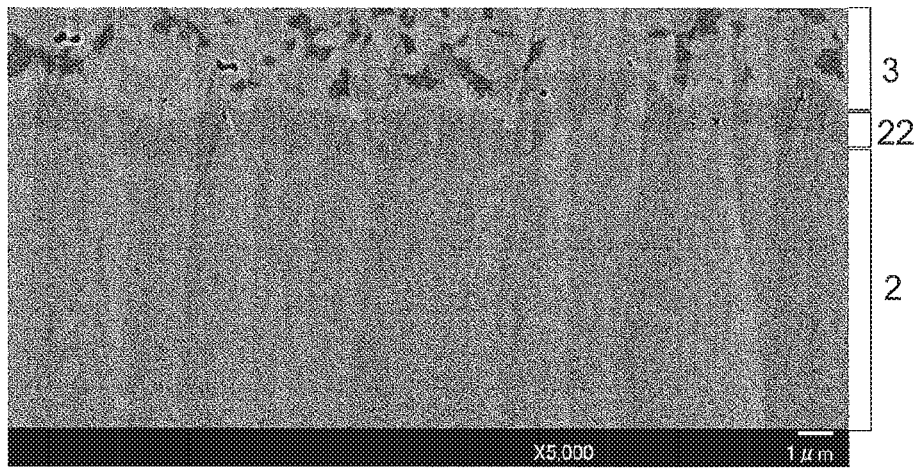
FIG. 10 is an electron micrograph of a cross-section of an electrochemical element.

Furthermore, FIG. 10 shows a result of SEM observation performed on a cross-section of the electrochemical element 1 produced in Reference Example 7. As shown in FIG. 10, the metal oxide film 22 had a minimum thickness of approximately 0.6 µm, a maximum thickness of approximately 1.4 µm, and an average thickness of approximately 0.85 µm. Furthermore, EPMA observation performed on a cross-section of the electrochemical element 1 produced in Reference Example 7 showed that the diffusion of Cr to the electrode layer had comparatively increased.

As a result, it was seen that, if the sintering step was performed in an $H_2/H_2O/N_2$ mixture gas atmosphere adjusted to an oxygen partial pressure of $7.2 \times 10^{-14}$ atm at 1150° C., the electrical resistance of the metal substrate became extremely large, and the performance of the electrochemical element was reduced. Furthermore, the effect of suppressing diffusion of Cr from the metal substrate 2 was reduced, and thus a $CeCrO_3$ complex oxide was observed in the X-ray diffraction measurements.

It is seen from the results in Reference Example 2 to 7 above that the metal oxide film 22 can be formed on the surface of the metal substrate 2 onto which the gas-permeable electrode layer 3 is applied. Furthermore, it is seen that, if the thickness of the metal oxide film 22 is of the submicron order, the mutual diffusion of elements between the metal substrate 2 and the electrode layer 3 can be suppressed. In particular, it is seen that the average thickness of the metal oxide film 22 is preferably about 0.3 µm to about 0.7 µm. Furthermore, it is preferable that the metal oxide film 22 is mainly made of chromium oxide, and that the electrochemical element 1 does not substantially contain a complex oxide of Cr and an element forming the electrode layer 3 (the complex oxide cannot be observed in X-ray diffraction). In addition, it is seen that the sintering step preferably includes at least a sintering step performed at 800° C. or higher and 1100° C. or lower and preferably 850° C. or higher and 1050° C. or lower, and at an oxygen partial pressure of $1.0\times10^{-20}$ atm or more and $5.0\times10^{-15}$ atm or less.

Example 3

A plurality of through holes 21 were formed by performing laser processing in a region within a 2.5 mm radius from the center of a circular crofer22APU metal plate having a thickness of 0.3 mm a diameter of 25 mm, and thus a metal substrate 2 was obtained. At this time, the through holes 21 were formed by performing laser processing such that the through holes each had a diameter of approximately 10 to 15 μm the surface of the metal substrate 2.

Next, 60% by weight of NiO powder and 40% by weight of GDC powder were mixed, and an organic binder and an organic solvent were added thereto, to obtain a paste. As hole filling treatment, the paste was sprayed onto a region within a 3 mm radius from the center of the metal substrate 2, and was dried over at 80° C. Through observing the surface using an optical microscope, it was seen that the through holes 21 were filled by the paste. Subsequently, the paste was sprayed again and deposited on the same region of the metal substrate 2, and was dried over at 60° C. An electrode layer 3 was formed in this manner (electrode layer forming step).

Next, the metal substrate 2 on which the electrode layer 3 was arranged was subjected to degreasing treatment at 450° C. in air. Next, sintering was performed for one hour in an $H_2/H_2O/N_2$ mixture gas atmosphere adjusted to an oxygen partial pressure of $7.0\times10^{-20}$ atm at 850° C. (sintering step).

Next, an organic binder and an organic solvent were added to a GDC fine powder, to obtain a paste. The paste was sprayed and deposited on a region within a 5 mm radius from the center of the metal substrate 2 on which the electrode layer was arranged, and thus a buffer layer 6 was formed.

Next, the metal substrate 2 on which the buffer layer 6 was arranged was fired at 1050° C. (buffer layer forming step).

The thickness of the electrode layer 3 obtained through the above-described steps was about 10 μm, and the thickness of the buffer layer 6 was about 6 μm.

Subsequently, an 8YSZ (yttria-stabilized zirconia) powder having a mode diameter of approximately 0.7 μm was aerosolized in dry air at a flow rate of 6 L/min. The aerosol was introduced into a chamber at a pressure of 190 Pa, and an electrolyte layer 4 was formed by spraying this aerosol over a range of 15 mm×15 mm onto the buffer layer 6 of the metal substrate 2, so as to cover the buffer layer 6. At that time, the spraying was performed at room temperature without heating the metal substrate 2 (electrolyte layer forming step). In this manner, an electrochemical element 1 was obtained.

The thickness of the electrolyte layer 4 obtained through the above-described steps was about 6 μm.

Subsequently, a paste containing platinum was applied onto the electrolyte layer 4, and was fired for one hour at 930° C. in air, and thus a counter electrode layer 5 was formed (counter electrode layer forming step). Through the above-described steps, a solid oxide fuel cell was obtained.

An open circuit voltage (OCV) of the obtained solid oxide fuel cell was measured while supplying hydrogen gas to the electrode layer 3 and air to the counter electrode layer 5. According to the measurement result, the voltage was 1.10 V at 650° C., 1.07 V at 700° C., and 1.04 V at 750° C.

Example 4

A plurality of through holes 21 were formed by performing laser processing in a region within a 7.5 mm radius from the center of a circular crofer22APU plate having a thickness of 0.3 mm and a diameter of 25 mm, and thus a metal substrate 2 was obtained. At this time, the through holes were formed by performing laser processing such that the through holes each had a diameter of approximately 10 to 15 μm on the surface of the metal substrate 2.

Next, 60% by weight of NiO powder and 40% by weight of YSZ powder were mixed, and an organic binder and an organic solvent were added thereto, to obtain a paste. The paste was applied to form an electrode layer 3 by using a screen printing method in a region within a 3 mm radius from the center of the metal substrate 2 (electrode layer forming step). With this treatment, the through holes 21 were filled and the electrode layer 3 was formed.

Next, the metal substrate 2 on which the electrode layer 3 was arranged was subjected to degreasing treatment at 450° C. in air. Next, sintering was performed for one hour in an $H_2/H_2O/N_2$ mixture gas atmosphere adjusted to an oxygen partial pressure of $7.0\times10^{-20}$ atm at 850° C. (sintering step).

Next, an organic binder and an organic solvent were added to a GDC fine powder, to obtain a paste. The paste was used to form a buffer layer 6 by using a screen printing method in a region within a 5 mm radius from the center of the metal substrate 2 on which the electrode layer was arranged.

Next, the metal substrate 2 on which the buffer layer 6 was arranged was fired at 1050° C. (buffer layer forming step).

The thickness of the electrode layer 3 obtained through the above-described steps was about 18 μm, and the thickness of the buffer layer 6 was about 10 μm.

Subsequently, an 8YSZ (yttria-stabilized zirconia) powder having a mode diameter of approximately 0.7 μm was aerosolized in dry air at a flow rate of 6 L/min. The aerosol was introduced into a chamber at a pressure of 240 Pa, and an electrolyte layer 4 was formed by spraying this aerosol over a range of 15 mm×15 mm onto the buffer layer 6 of the metal substrate 2, so as to cover the buffer layer 6. At that time, the spraying was performed at room temperature without heating the metal substrate 2 (electrolyte layer forming step). In this manner, an electrochemical element 1 was obtained.

The thickness of the electrolyte layer 4 obtained through the above-described steps was about 7 μm.

Next, an organic binder and an organic solvent were added to a GDC fine powder, to obtain a paste. The paste was used to form a reaction preventing layer by using a screen printing method on the electrolyte layer 4 of the electrochemical element 1.

Subsequently, the metal-supported electrochemical element E in which the reaction preventing layer was formed was fired at 1000° C. (reaction preventing layer forming step).

Furthermore, a GDC powder and an LSCF powder were mixed, an organic binder and an organic solvent were added thereto, to obtain a paste. The paste was used to form a counter electrode layer 5 by using a screen printing method on the reaction preventing layer. Lastly, the electrochemical element 1 on which the counter electrode layer 5 was formed was fired at 900° C. (counter electrode layer forming step), and thus a solid oxide fuel cell 100 was obtained.

An open circuit voltage (OCV) of the obtained solid oxide fuel cell was measured while supplying hydrogen gas to the electrode layer 3 and air to the counter electrode layer 5. According to the measurement result, the voltage was 0.98 V at 750° C. Measurements on obtained currents showed that, at 750° C., a current at 350 mA/cm$^2$ was obtained at a voltage of 0.80 V, and a current at 550 mA/cm$^2$ was obtained at a voltage of 0.71 V.

Figure 12:
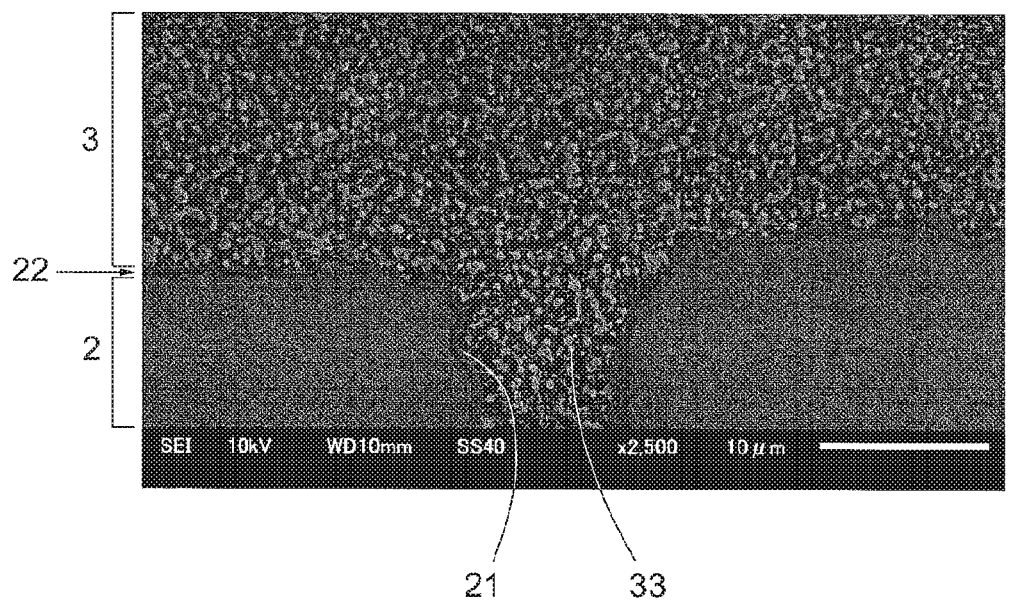
FIG. 12 is an electron micrograph of a cross-section of an electrochemical element.

FIG. 12 shows an electron micrograph of a cross-section of the thus obtained electrochemical element 1. It is seen that the electrode layer 3 was inserted into a through hole 21 of the metal substrate 2. That is to say, the insertion portions 33 that were inserted into the through holes 21 of the metal substrate 2 and blocked the through holes 21 were formed. The thus formed insertion portions 33 were provided in a state of being inserted to a depth of about 50 μm from the surface of the metal substrate 2. No significant defects such as voids or cracks were seen in a region, of the electrode layer 3, on the upper side of the through holes 21. That is to say, it is seen that, if the electrode layer 3 is inserted into the through holes 21 of the metal substrate 2 and the insertion portions 33 that block the through holes 21 are formed, a good electrode layer is formed also on the upper side of the through holes 21, as in the region on the upper side of a part where the through holes 21 are not formed.

INDUSTRIAL APPLICABILITY

Application to an electrochemical element and a solid oxide fuel cell having excellent durability is possible.

DESCRIPTION OF REFERENCE SIGNS

1: Electrochemical element
2: Metal substrate
21: Through hole
22: Metal oxide film
3: Electrode layer
31: Second layer (upper part)
32: First layer (lower part)
33: Insertion portion
34: Pore
35: Opening
4: Electrolyte layer
41: First portion
42: Second portion
43: Fine particle
5: Counter electrode layer
100: Solid oxide fuel cell

The invention claimed is:

1. An electrochemical element comprising:
a metal substrate having a plurality of through holes;
an electrode layer provided over a front face of the metal substrate; and
an electrolyte layer provided over the electrode layer,
wherein the through holes are provided passing through the front face and a back face of the metal substrate,
the electrode layer is provided in a region larger than a region, of the metal substrate, in which the through holes are provided, and
the electrolyte layer has a first portion coating the electrode layer, and a second portion that is in contact with the front face of the metal substrate.

2. The electrochemical element according to claim 1, wherein the electrode layer has insertion portions that are inserted into the through holes and block the through holes.

3. The electrochemical element according to claim 1, wherein an upper part, of the electrode layer, that is adjacent to the electrolyte layer has a strength higher than that of a lower part thereof adjacent to the metal substrate.

4. The electrochemical element according to claim 1, wherein an upper part, of the electrode layer, that is adjacent to the electrolyte layer has a density higher than that of a lower part thereof adjacent to the metal substrate.

5. The electrochemical element according to claim 1,
wherein the electrode layer is made of cermet, and
an upper part, of the electrode layer, that is adjacent to the electrolyte layer has a content ratio of cermet aggregate higher than that of a lower part thereof adjacent to the metal substrate.

6. The electrochemical element according to claim 1, wherein the metal substrate is made of a ferrite-based stainless steel.

7. The electrochemical element according to claim 1, wherein the electrolyte layer contains a zirconia-based ceramic.

8. An electrochemical element comprising:
a metal substrate having a plurality of through holes;
an electrode layer provided over a front face of the metal substrate; and
an electrolyte layer provided over the electrode layer,
wherein the through holes are provided passing through the front face and a back face of the metal substrate,
the through holes are formed inside a region in which the electrolyte layer is formed, and
the electrolyte layer has a first portion coating the electrode layer, and a second portion that is in contact with the front face of the metal.

9. A solid oxide fuel cell in which a counter electrode layer functioning as a counter electrode of the electrode layer is provided over the electrolyte layer of the electrochemical element according to claim 1.

10. A method for producing an electrochemical element having a metal substrate, an electrode layer, and an electrolyte layer, in which the metal substrate has a plurality of through holes that are provided passing through a front face and a back face thereof, the method comprising:
an electrode layer forming step of forming an electrode layer in a region larger than a region, of the front face of the metal substrate, in which the through holes are provided; and
an electrolyte layer forming step of, after the electrode layer forming step, forming an electrolyte layer having a first portion coating the electrode layer, and a second portion that is in contact with the front face of the metal substrate, by affixing an electrolyte material, which is a material for forming the electrolyte layer, to an area extending over the electrode layer and the front face of the metal substrate.

11. The method for producing an electrochemical element according to claim 10, wherein the electrode layer forming step has:
a preliminary applying step of applying electrode layer material paste containing an electrode layer material to the front face of the metal substrate;
a pushing and wiping step of, after the preliminary applying step, pushing the electrode layer material paste into the through holes and wiping away the electrode layer material paste remaining on the front face of the metal substrate; and a main applying step of, after the pushing and wiping step, applying the electrode layer material paste to the front face of the metal substrate.

12. The method for producing an electrochemical element according to claim 11,
wherein the electrode layer material paste is diluted with a solvent, and
a solvent dilution ratio of the electrode layer material paste used in the preliminary applying step is higher than a solvent dilution ratio of the electrode layer material paste used in the main applying step.

13. The method for producing an electrochemical element according to claim 10,
wherein the electrode layer is made of cermet, and
the electrode layer forming step has two steps performed with different proportions of aggregate mixed into an electrode layer material, which is a material for forming the electrode layer, consisting of:
a first forming step of forming an electrode layer using the electrode layer material in which the aggregate mixed proportion is a first proportion; and
a second forming step of, after the first forming step, forming an electrode layer using the electrode layer material in which the aggregate mixed proportion is a second proportion, which is higher than the first proportion.

14. A method for producing a solid oxide fuel cell,
comprising: a counter electrode layer forming step of, after the method for producing an electrochemical element according to claim 10 is performed, forming a counter electrode layer functioning as a counter electrode of the electrode layer, over the electrolyte layer.

\* \* \* \* \*